(12) United States Patent
Astley et al.

(10) Patent No.: US 7,487,246 B2
(45) Date of Patent: *Feb. 3, 2009

(54) GAPLESS DELIVERY AND DURABLE SUBSCRIPTIONS IN A CONTENT-BASED PUBLISH/SUBSCRIBE SYSTEM

(75) Inventors: Mark C. Astley, Pompton Lakes, NJ (US); Joshua S. Auerbach, Ridgefield, CT (US); Sumeer K. Bhola, White Plains, NY (US); Marc A. Kaplan, Katonah, NY (US); Robert E. Strom, Ridgefield, CT (US); Yuanyuan Zhao, Garnerville, NY (US)

(73) Assignee: Irternational Business Machines Corporation, Armonk, NY (US)

( * ) Notice: Subject to any disclaimer, the term of this patent is extended or adjusted under 35 U.S.C. 154(b) by 88 days.

This patent is subject to a terminal disclaimer.

(21) Appl. No.: 11/479,264

(22) Filed: Jun. 30, 2006

(65) Prior Publication Data

US 2006/0248219 A1  Nov. 2, 2006

Related U.S. Application Data

(62) Division of application No. 10/177,474, filed on Jun. 21, 2002, now Pat. No. 7,162,524.

(51) Int. Cl.
*G06F 15/173* (2006.01)
*G06F 15/16* (2006.01)

(52) U.S. Cl. .................. 709/226; 709/203; 709/228; 710/6; 715/522

(58) Field of Classification Search ............... 709/224, 709/228, 238, 226, 203; 710/6; 715/522
See application file for complete search history.

(56) References Cited

U.S. PATENT DOCUMENTS 5,970,469 A * 10/1999 Scroggie et al. ............... 705/14
6,532,494 B1 * 3/2003 Frank et al. .................. 709/224
6,658,568 B1 * 12/2003 Ginter et al. ................. 713/193

* cited by examiner

*Primary Examiner*—Khanh Dinh
(74) *Attorney, Agent, or Firm*—Douglas W. Cameron; Ryan, Mason & Lewis, LLP

(57) ABSTRACT

A content-based publish/subscribe system for providing gapless message delivery from a publishing client to a subscribing client is disclosed. The system includes a plurality of brokers operatively coupled to one another via a network. Each of the brokers include at least one processor and are configured as a publisher-hosting broker, a subscriber-hosting broker or an intermediate broker. The subscriber-hosting broker may be operatively coupled to the publisher-hosting broker via the network through the intermediate broker. At least a portion of the plurality of brokers are configured so as to eliminate a need for persistent storage of messages at the intermediate broker and to substantially guarantee a gapless delivery of one or more messages transmitted by the publishing client to the subscribing client, even in the presence of a failure in the publish/subscribe system.

11 Claims, 10 Drawing Sheets

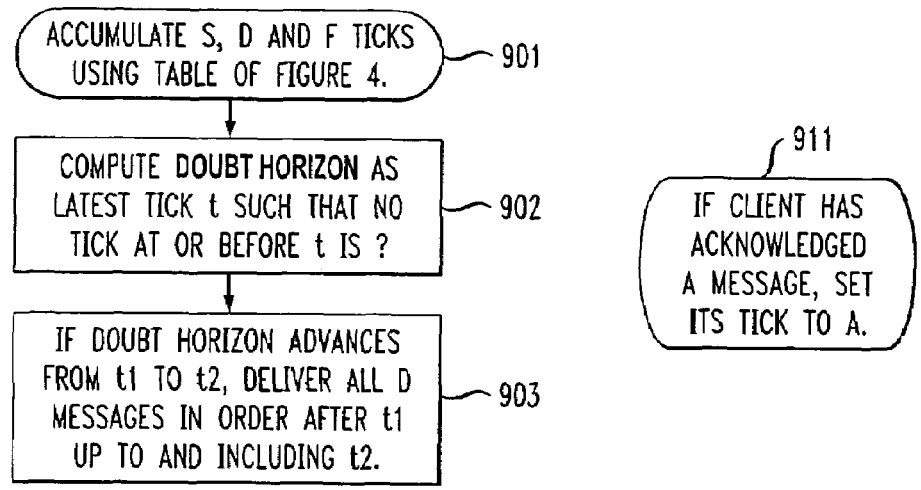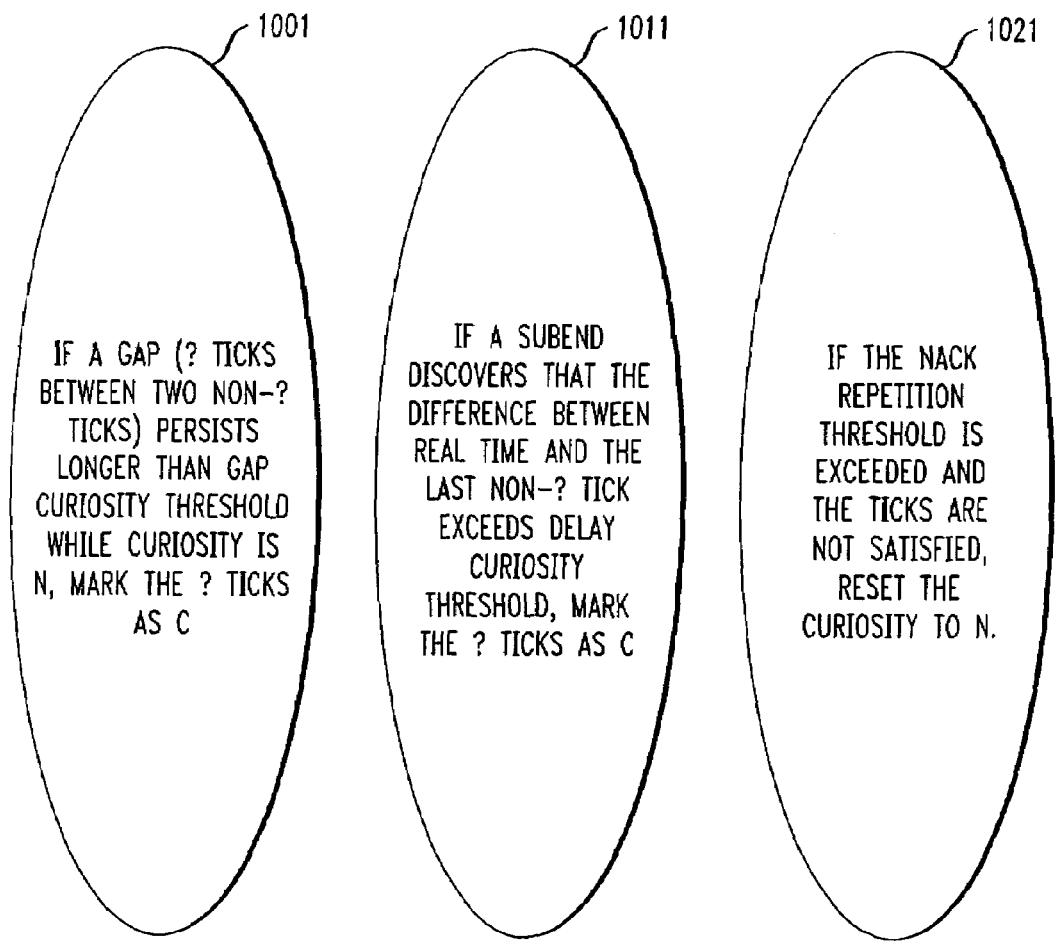

GAPLESS DELIVERY AND DURABLE SUBSCRIPTIONS IN A CONTENT-BASED PUBLISH/SUBSCRIBE SYSTEM

CROSS-REFERENCE TO RELATED APPLICATION(S)

This application is a divisional of U.S. application Ser. No. 10/177,474, filed on Jun. 21, 2002 (Now U.S. Pat. No. 7,162,524), the disclosure of which is incorporated by reference herein.

FIELD OF THE INVENTION

The present invention relates generally to content-based publish/subscribe systems, and more particularly relates to techniques for providing gapless delivery of information to subscribers in a publish/subscribe system.

BACKGROUND OF THE INVENTION

In content-based publish/subscribe systems, publishers typically post information on the system and subscribers generally specify their interest in receiving certain information in terms of predicates on the posted information. Intermediate brokers, which may reside between the publishers and subscribers, typically filter information in order to forward only the relevant information that is requested to downstream subscribers connected to the intermediate brokers. In the course of forwarding information from a publisher to a subscriber, however, information can be lost or otherwise corrupted, often as a result of a system failure. System failures can occur in one or more of the publishers, subscribers, and/or intermediate brokers, or in one or more links connecting such entities with one another. Therefore, it is advantageous to provide a publish/subscribe system which incorporates features for protecting against such loss of information.

There are various motivations which exist for providing gapless delivery of information in the presence of system failures, including, for example: (1) service agreements (e.g., it is unacceptable for certain stock traders not to be able to access a trade event that others can access); and (2) message interdependencies, wherein messages may be used by a subscribing application to accumulate a view (e.g., a snapshot of a sporting event), where missing or reordered messages can cause an incorrect state to be displayed.

Conventional solutions to the problem of safeguarding information against system failures typically employ message queuing which utilizes store-and-forward routing protocols, wherein each intermediate broker in the publish/subscribe system must reconstruct a gapless information stream prior to forwarding messages to a downstream broker. Such conventional protocols, however, generally cannot support a high-throughput since the information stream is delayed when a broker recovers from a failure, or when a single message is lost. Existing message queuing systems typically implement store-and-forward routing protocols by logging a message to persistent storage at every intermediate broker in the system. This technique, however, consumes a significant amount of memory and requires increased system overhead, which in turn undesirably impacts system cost and speed.

Consequently, there exists a need for improved techniques for use in a publish/subscribe system, for providing gapless delivery of information to subscribers in the system, despite failures which may occur in the system.

SUMMARY OF THE INVENTION

An illustrative embodiment of the present invention provides techniques for gapless delivery of messages in a content-based publish/subscribe system which may be implemented as a plurality of distributed brokers, including publisher-hosting brokers and subscriber-hosting brokers. Gapless delivery of messages is performed by logging messages to persistent storage only at publisher-hosting brokers, thereby essentially eliminating the need for maintaining persistent state for normal subscribers, while significantly reducing the amount of persistent state maintained for durable subscribers. Moreover, the publish/subscribe system is configured to provide such gapless delivery of information without the need for performing hop-by-hop reliability and/or store-and-forward routing protocols, which undesirably impact system throughput and cost.

In accordance with one aspect of the present invention, a content-based publish/subscribe system for providing gapless message delivery includes a plurality of brokers operatively coupled to one another via a network. Each of the brokers include at least one processor and is configured as a publisher-hosting broker, a subscriber-hosting broker or an intermediate broker. The subscriber-hosting broker may be operatively coupled to the publisher-hosting broker via the network through the intermediate broker. At least a portion of the plurality of brokers are configured so as to eliminate a need for persistent storage of messages at the intermediate broker and to substantially guarantee a gapless delivery of one or more messages transmitted by the publishing client to the subscribing client, even in the presence of a failure in the publish/subscribe system.

In the publisher-hosting broker mode, the at least one processor is operative to: (i) receive a message from a publishing client coupled to the publish/subscribe system; (ii) store the received message and a stream state corresponding thereto; and (iii) transmit the message to one or more downstream brokers. In the intermediate broker mode, the at least one processor is operative to: (i) receive a knowledge message from an upstream broker; (ii) accumulate the received knowledge message with an existing information stream; (iv) in response to a request for knowledge, transmit at least a portion of the accumulated knowledge messages satisfying at least a portion of the request for knowledge to one or more downstream brokers; and (v) transmit curiosity messages corresponding the knowledge messages that cannot be satisfied to one or more upstream brokers. In the subscriber-hosting broker mode, the at least one processor is operative to: (i) receive a knowledge message from an upstream broker; (ii) determine an original maximum time interval in which all messages therein are known; (iii) accumulate one or more received knowledge messages in a subend knowledge stream; (iv) determine a new maximum time interval in which all messages therein are known based on the accumulated knowledge messages; and (v) when the new maximum time interval is greater than the original maximum time interval, transmit all knowledge messages between the new and original maximum time intervals to one or more subscriber clients.

These and other objects, features and advantages of the present invention will become apparent from the following

BRIEF DESCRIPTION OF THE DRAWINGS

FIG. 9 is a logical flow diagram illustrating additional exemplary processing steps performed at a subend, in accordance with the invention.

FIG. 10 is a logical flow diagram illustrating additional exemplary processing steps performed at information streams to initiate curiosity, in accordance with the invention.

DETAILED DESCRIPTION OF PREFERRED EMBODIMENTS

The present invention will be described in conjunction with an illustrative content-based publish/subscribe system including a plurality of broker machines or brokers which are preferably connected together to form an overlay network, although alternative connection arrangements are contemplated by the invention. The plurality of brokers are responsible for delivery of one or more messages sent by publishing clients to subscribing clients based, at least in part, on the content of these messages and/or on filtering predicates requested by the subscribing clients.

The invention is capable of supporting at least two types of subscribers, namely, normal subscribers and durable subscribers. Normal subscribers, as used herein, are intended to refer to subscribers which essentially only receive a gapless information stream while they are connected to and/or communicating with the system. Alternatively, durable subscribers, as used herein, are intended to refer to those subscribers which receive a gapless information stream across one or more disconnects and reconnects. Both types of subscribers are substantially unaffected by intermediate broker and/or link failures. First, the gapless delivery methodology of the present invention will be described below in conjunction with normal subscribers (Section 1—"Gapless Delivery Protocol"). Next, the gapless delivery methodology of the present invention will be described in conjunction with durable subscribers (Section 2—"Durable Message Streams"). It is to be appreciated that certain terminology and features of the gapless delivery protocol may similarly apply to durable message streams, as will be explained below.

1. Gapless Delivery Protocol

The brokers may be grouped according to certain functions. For example, one or more of the brokers are preferably specialized for hosting publishing clients. These brokers are referred to herein as publisher hosting brokers or PHBs. Furthermore, one or more of the brokers are preferably specialized for hosting subscribing clients. These brokers are referred to herein as subscriber hosting brokers or SHBs. Between the PHBs and SHBs there may exist any number of intermediate hops that include routing and/or filtering. The brokers at such hops are referred to herein as intermediate brokers or IBs. For ease of explanation, it will be assumed that each of the different brokers are separate entities. In an actual implementation, however, it is contemplated that any one broker may be capable of performing the functions of one or more PHBs, SHBs and IBs.

Figure 1A:
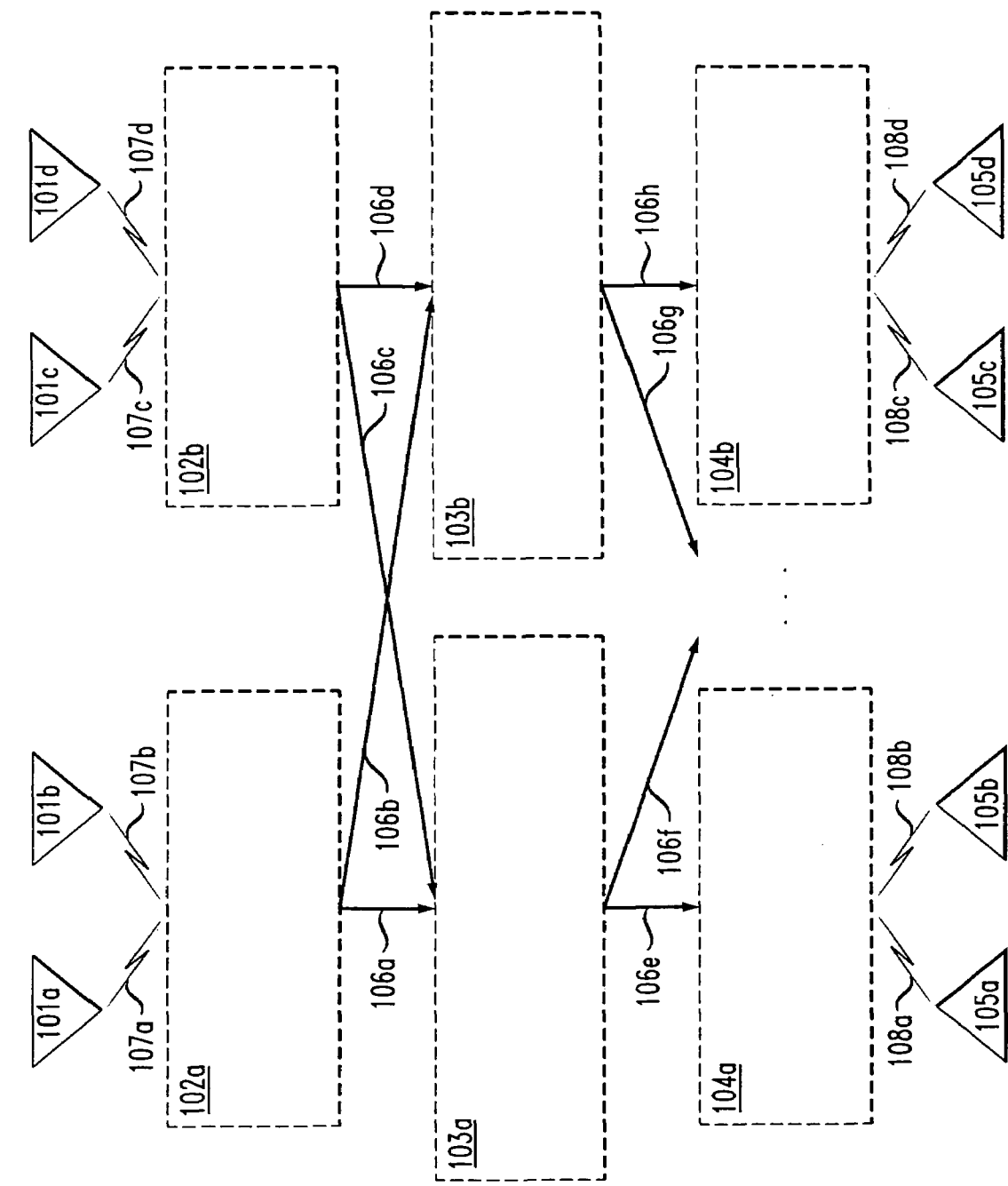
FIG. 1A is a graphical illustration depicting at least a portion of a network comprising brokers, publishing clients and subscribing clients, formed in accordance with one aspect of the present invention.

FIG. 1A illustrates at least a potion of an exemplary network of brokers, formed in accordance with one aspect of the invention. Publishing clients 101a, 101b, 101c and 101d, preferably establish connections to particular PHBs, 102a and 102b, over corresponding client connections 107a, 107b, 107c and 107d, respectively. The client connections may generally be any type of communication medium for conveying transmitted information, including a wireless communication link, such as, for example, infrared, radio frequency, satellite, microwave, etc., and a dedicated communication connection, such as, for example, telephone, cable, fiber optic, etc. Preferably, each of the client connections are a reliable, first-in-first-out (FIFO) connection, such as, but not limited to, a Transport Control Protocol/Internet Protocol (TCP/IP) socket connection.

Independently, subscribing clients 105a, 105b, 105c and 105d preferably establish connections to SHBs 104a and 104b over corresponding client connections 108a, 108b, 108c and 108d, respectively. Clients connections 108a, 108b, 108c and 108d are preferably consistent with client connections 107a, 107b, 107c and 107d previously described. The PHBs 102a, 102b and SHBs 104a, 104b may be connected to IBs 103a and 103b via broker-to-broker connections 106a, 106b, 106c, 106d, 106e, 106f, 106g and 106h. Since the gapless delivery protocol of the present invention tolerates connection failures and message reordering, it is not necessary for the broker-to-broker connections to use reliable FIFO protocols such as TCP/IP, but may advantageously use faster, less reliable protocols, thereby increasing system throughput.

Figure 1B:
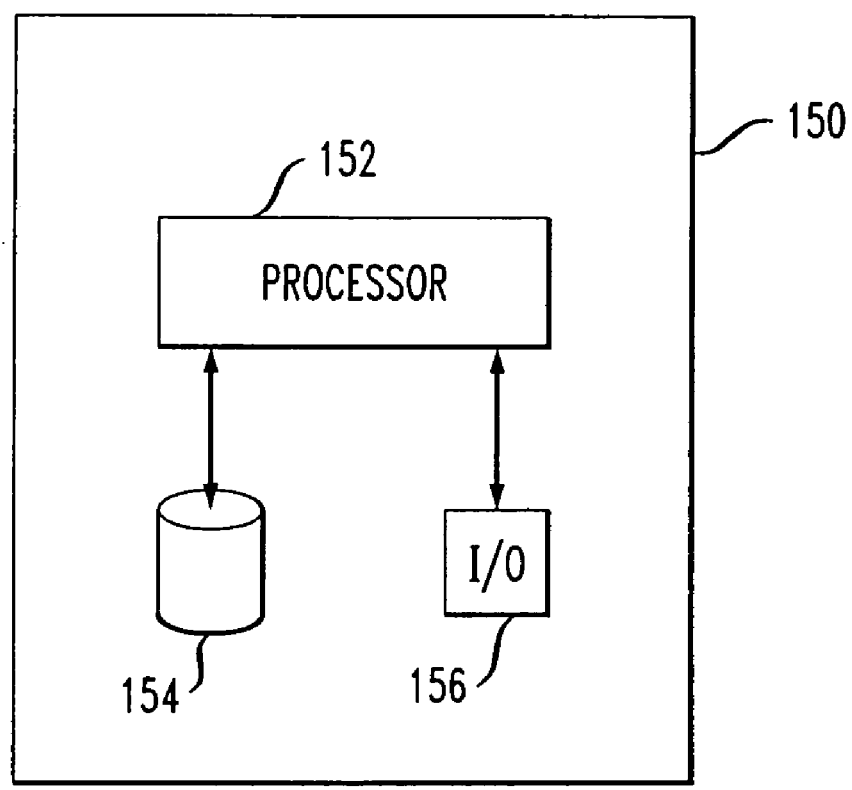
FIG. 1B is a graphical illustration depicting an implementation of a broker associated with the network.

As shown in FIG. 1B, each broker 150 may be implemented in accordance with a processor 152, memory 154 and one or more input/output (I/O) devices 156. It is to be appreciated that the term "processor" as used herein is intended to include any processing device, such as, for example, one that includes a central processing unit (CPU) and/or other processing circuitry (e.g., microprocessor). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "input/output devices" or "I/O devices" as used herein is intended to include, for example, one or more input devices (e.g., keyboard, mouse, network interface card, etc.) for entering data to the processor, and/or one or more output devices (e.g., printer, monitor, network interface card, etc.) for presenting the results associated with the processor.

Accordingly, an application program, or software components thereof, including instructions or code for performing the methodologies of the invention, as will be further described herein, may be stored in one or more of the associated storage media (e.g., ROM, fixed or removable storage) and, when ready to be utilized, loaded in whole or in part (e.g., into RAM) and executed by the processor 152. Thus, each broker may be, for example, either a standalone computer, a process or application running on a computer, or, to minimize delay due to system failures, a cluster of redundant processes running in a distributed manner within multiple computers.

Figure 2:
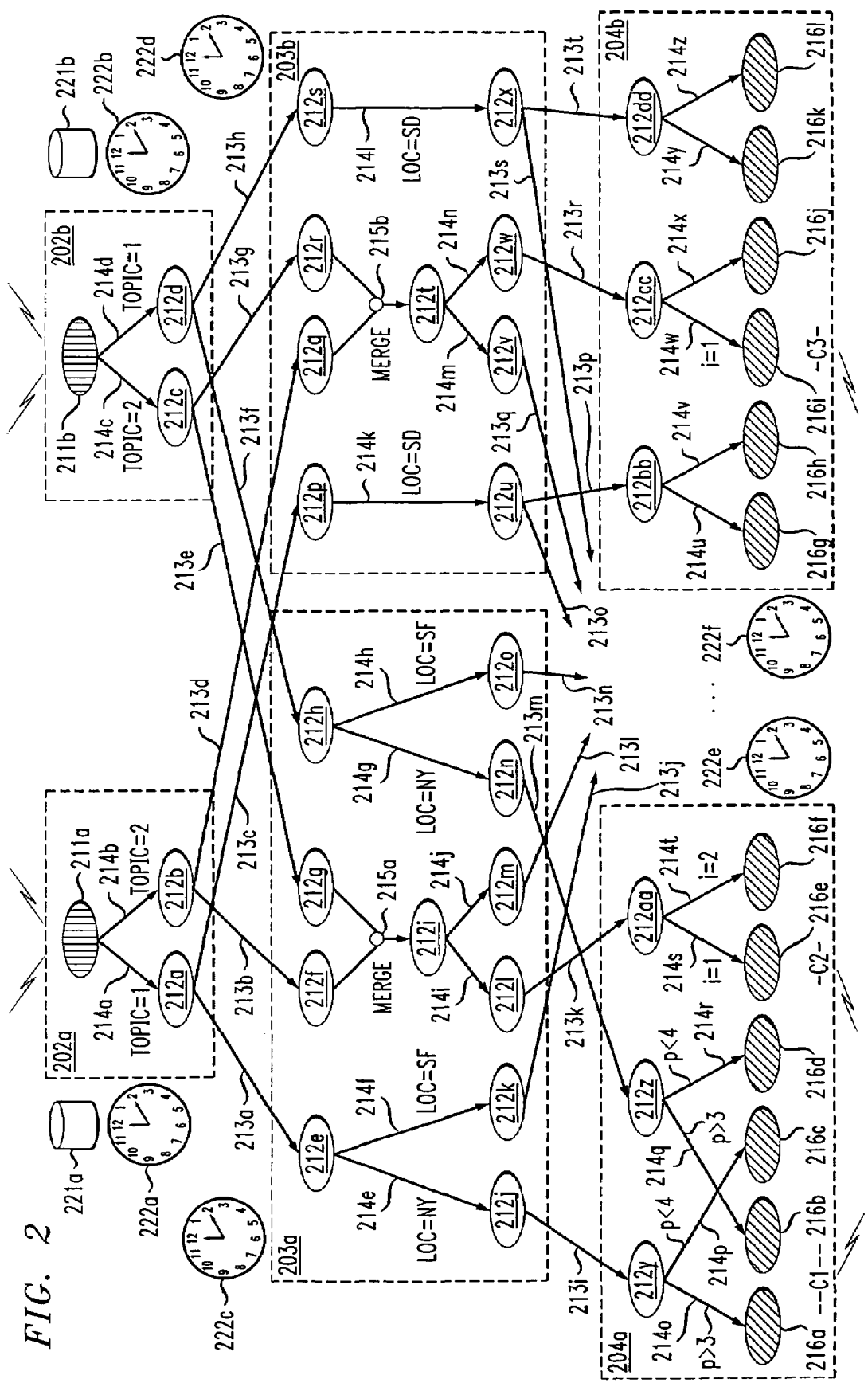
FIG. 2 is a graphical illustration depicting at least a portion of a network comprising broker components, including clocks, stable storage, information streams, and transforms, in accordance with the present invention.

With reference now to FIG. 2, there is shown an exemplary information flow diagram illustrating an implementation of the broker network, in accordance with one aspect of the present invention. As apparent from the figure, the illustrative information flow diagram for the broker network comprises a plurality of nodes (depicted as ovals), referred to herein as information streams, and edges or paths (depicted as arrows between a source oval and a destination oval), referred to herein as transforms. The information flow diagram may be constructed by a system administrator, either statically or in response to subscription requests. The information flow diagram defines paths between source information streams 211a and 211b, referred to herein as pubends, and destination information streams 216a, 216b, 216c, 216d, 216e, 216f, 216g, 216h, 216i, 216j, 216k, 216l (collectively, 216), referred to herein as subends, via intermediate information streams 212a, 212b, 212c, 212d, 212e, 212f, 212g, 212h, 212i, 212j, 212k, 212l, 212m, 212n, 212o, 212p, 212q, 212r, 212s, 212t, 212u, 212v, 212w, 212x, 212y, 212z, 212aa, 212bb, 212cc, 212dd (collectively, 212).

Preferably, each publishing client delivers messages to exactly one pubend, while each subscribing client receives messages from one or more subends within a single SHB. Each transform is either a filter transform 214a, 214b, 214c, 214d, 214e, 214f, 214g, 214h, 214i, 214j, 214k, 214l, 214m, 214n, 214o, 214p, 214q, 214r, 214s, 214t, 214u, 214v, 214w, 214x, 214y, 214z (collectively, 214), a link transform 213a, 213b, 213c, 213d, 213e, 213f, 213g, 213h, 213i, 213j, 213k, 213l, 213m, 213n, 213o, 213p, 213q, 213r, 213s (collectively, 213), or a merge transform 215a, 215b. Information can be delayed, lost, or reordered while passing through a given transform, although in practice this will typically only occur over links.

Filters preferably include a predicate denoting a content filter. For example, filter 214e specifies that only messages having content matching "Loc=NY" will pass. A filter having no predicate associated therewith (e.g., 214i and 214j) passes all content, and is essentially equivalent to a link.

Each broker 202a, 202b, 203a, 203b, 204a, 204b preferably has a timer or clock 222a, 222b, 222c, 222d, 222e, 222f, respectively, associated therewith. Although the methodologies of the present invention do not require that these clocks be synchronized to real time, performance may be improved if these clocks are at least approximately accurate, or synchronized with respect to one another. In addition to having a clock associated with a particular broker, PHBs 202a and 202b are required to include a stable storage medium 221a and 221b, respectively, associated therewith. Stable storage is intended to include nonvolatile memory, such as, for example, RAM, fixed storage, removable storage, etc. The remaining brokers (e.g., SHBs and IBs) 203a, 203b, 204a, 204b do not require stable storage, but may instead use "soft" state. The ability of the present invention to only require stable storage in PHBs and to allow SHBs and IBs to utilize soft state, advantageously distinguishes the broker network of the present invention from other protocols which employ store-and-forward techniques. These conventional protocols generally require stable storage associated with each broker in the network.

The path(s) from pubends to a given client's subend(s) determine which messages that client is guaranteed to receive. Specifically, each path propagates messages satisfying a conjunction (i.e., logical AND) of the predicates corresponding to each filter along the path. If there are multiple paths associated with a given node, that node receives messages that satisfy a disjunction (i.e., logical OR) of the path filters.

By way of example only, consider a client C1, which is associated with subends 216a and 216b. Based on the paths, namely, 214o, 213i, 214e, 213a and 214a, between subend 216a and a pubend, C1 will receive messages published to pubend 211a that satisfy the filters "Topic=1" & "Loc=NY" & "p>3," where the symbol "&" represents a logical AND operation. Likewise, based on the paths, namely, 214q, 213m, 214g, 213f and 214d, between subend 216b and a pubend, C1 will receive messages published to pubend 211b that satisfy the filters "Topic=1" & "Loc=NY" & "p>3."

Each subend is preferably an ordered stream. Therefore, client C1 will receive all relevant messages from pubend 211a (i.e., those messages having content which satisfy the filters associated with the given paths) in the order they were published, and all relevant messages from pubend 211b in the order they were published. However, between a message published to pubend 211a and another message published to pubend 211b there is no necessary order. This implies that, irrespective of publish times, it is generally unpredictable whether a given message from pubend 211a will arrive before or after a given message from pubend 211b. This is an example of a client subscription with content selection (e.g., Topic=1 & Loc=NY & p>3) and publisher order.

In contrast, consider client C2, which is associated with a single subend 216e. As shown in FIG. 2, the paths, namely, 214s, 213k, 214i, 215a, 213b, 214b, 213e and 214c between subend 216e and a pubend are the merge of filter "Topic=2" from pubend 211a and filter "Topic=2" from pubend 211b, further filtered by "i=1." Since client C2 has a single subend associated therewith, it receives a single ordered stream. This is an example of a client subscription with content selection (e.g., Topic=2 & i=1) and total order. Notice, that client C3 has a subscription with the same content selection (e.g., Topic=2 & i=1) and total order, and will therefore receive the same messages in the same order as client C2. This uniform total order property of the present broker network is a consequence of the fact that the merge transform is deterministic, meaning that two merge transforms receiving identical input information streams will produce the same merged output information stream.

The illustrative information flow diagram of FIG. 2 directs the gapless delivery methodologies of the present invention. In summary, each information stream preferably keeps track of what has occurred during each particular interval of time or tick. Thus, each information stream preferably comprises a data message (or a silence) and a curiosity representing how eager it is to learn about that tick. Knowledge flows downstream (i.e., in the direction of the arrows), while curiosity flows upstream (i.e., in a direction counter to the direction of the arrows). In accordance with the present invention, subends deliver messages when they detect that a gapless sequence of knowledge ticks has been extended. Pubends, on the other hand, log messages in stable storage. These logs maintained in stable storage may be subsequently utilized as arbiters of curiosity if no other broker has knowledge about what happened during a given tick.

Information Streams

Figure 3:
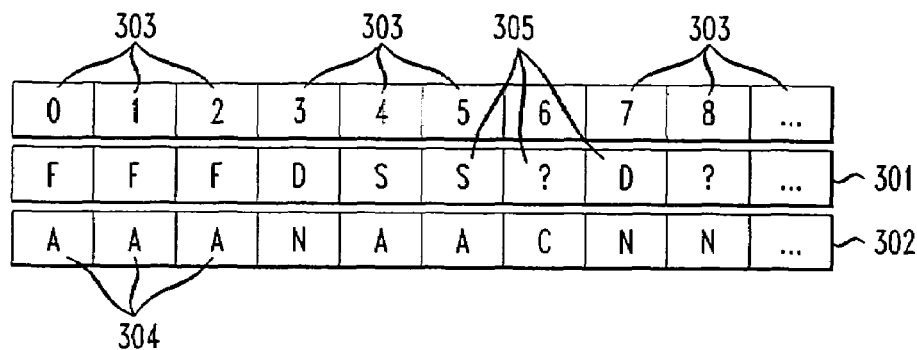
FIG. 3 is a graphical illustration depicting an organization of an information stream, in accordance with one aspect of the invention.

With reference now to FIG. 3, there is shown an exemplary representation of a knowledge stream. As previously explained, each node in the illustrative information flow diagram depicted in FIG. 2, whether a pubend 211, an intermediate node 212, or a subend 213, is an information stream comprising at least two components, namely, a knowledge stream 301 and a curiosity stream 302. The knowledge stream 301 preferably associates each tick of time 303 with a corresponding knowledge value 305 which represents what is known about that tick in the filtered path or paths from the pubend or pubends to its information stream. By way of example only, the following definitions may be used to classify the knowledge values in the knowledge stream:

"?" denotes ignorance—This value indicates that the information either has not reached the knowledge stream yet, or else it had once reached the information stream but was lost due to a failure or other condition (e.g., the need to empty any buffers due to insufficient memory).

"S" denotes silence—This value indicates that the tick is silent, either because nothing was published during that particular time interval, or because something was published but was filtered out on the path from the pubend to the information stream.

"D" denotes data—This value indicates that something was published and satisfies the appropriate filters. A D tick is preferably always accompanied by the actual data contained in the message.

"F" denotes finality—This value indicates that the tick had been either S or D, but the information stream no longer needs to remember the value because any downstream subscriber that needed data corresponding to that tick has already acknowledged receiving it.

It is to be appreciated that the above knowledge stream definitions are merely illustrative, and that different and/or additional definitions may be employed, as contemplated by the present invention.

The physical representation of the knowledge stream preferably exploits the facts that: (i) a prefix associated with the knowledge stream is typically comprised of a long stream of all F (representable by a single number, called by the final-Prefix); (ii) a suffix associated with the knowledge stream is typically comprised of a long stream of all ? (representable by a single number); and (iii) since ticks are preferably fine-grained, possible values elsewhere, from most likely to least likely, are:

One or more ranges of S
One or more ranges of ?
One or more isolated D.

The curiosity stream 302 preferably associates each tick with a corresponding curiosity value 304 which represents an importance in knowing its value. By way of example only, the following definitions may be used to represent curiosity values in the curiosity stream:

"C" denotes curious—This value indicates that it is important to learn and pass down the value associated with the given tick since delivery of data to clients may be delayed if ignorance (i.e., ?) persists.

"A" denotes anti-curious or acknowledged—This value indicates that it is not important to learn the value associated with the given tick because the corresponding value in the knowledge stream 301 is either silent (S), or if it was data (D), it has already been acknowledged by all downstream clients. In this instance, it is not important to pass down the value, although a prefix of all A ticks will preferably be piggybacked on all other messages. Any tick that has an A value in the curiosity stream can be turned into a corresponding F value in the knowledge stream, and vice versa.

"N" denotes neutral—This value means wait for data D or silence S, but do not waste bandwidth asking upstream sources about it. In this instance, data should be propagated eagerly and silence only if it can be piggybacked on data, or whenever a long enough time period has elapsed.

It is to be appreciated that the above curiosity stream definitions are merely illustrative, and that different and/or additional definitions may be employed, in accordance with the present invention.

For a pubend, an A value for a given tick preferably indicates that it is safe to eliminate the log corresponding to that tick, since no current subscriber will be curious about that value again. However, once a log is eliminated, no new subscriptions may be created asking about that tick or earlier ticks corresponding thereto.

As previously explained, knowledge propagates through the information flow diagram by means of messages that enter and leave the various transforms in the network. In this regard, a link is simply a transform that copies a message received at its input into its output for subsequent transmission, although the link may lose or reorder messages. In essence, a link is equivalent to a filter having an empty or null filter predicate. These messages represent incremental changes to the input (e.g., for a link or filter) or to one of the inputs (e.g., for a merge) to a given transform. The transform performs an appropriate action and then delivers a message to a downstream information stream to indicate an incremental change to its knowledge stream.

Since data D ticks are sparse relative to silence S ticks, and finality F ticks will essentially only be important when there is a prefix of them, knowledge messages with no more than one D tick per message are preferably formatted as follows:
  the length of the prefix of F ticks;
  the time and data value of a D tick, if one is present; or
  a range of silence preceding and following the D tick if present, otherwise simply a range of silence.

A message with a D tick is referred to herein as a data message, and a message without a D tick is referred to herein as a silence message. Additionally, messages preferably indicate whether they are "original" messages or "curious-only" messages. Original messages are propagated from an information stream to all downstream information streams whose filters match the message, regardless of curiosity. Curious-only messages, on the other hand, are sent only to downstream information streams whose filters match the message and who are curious about the message.

Figure 4:
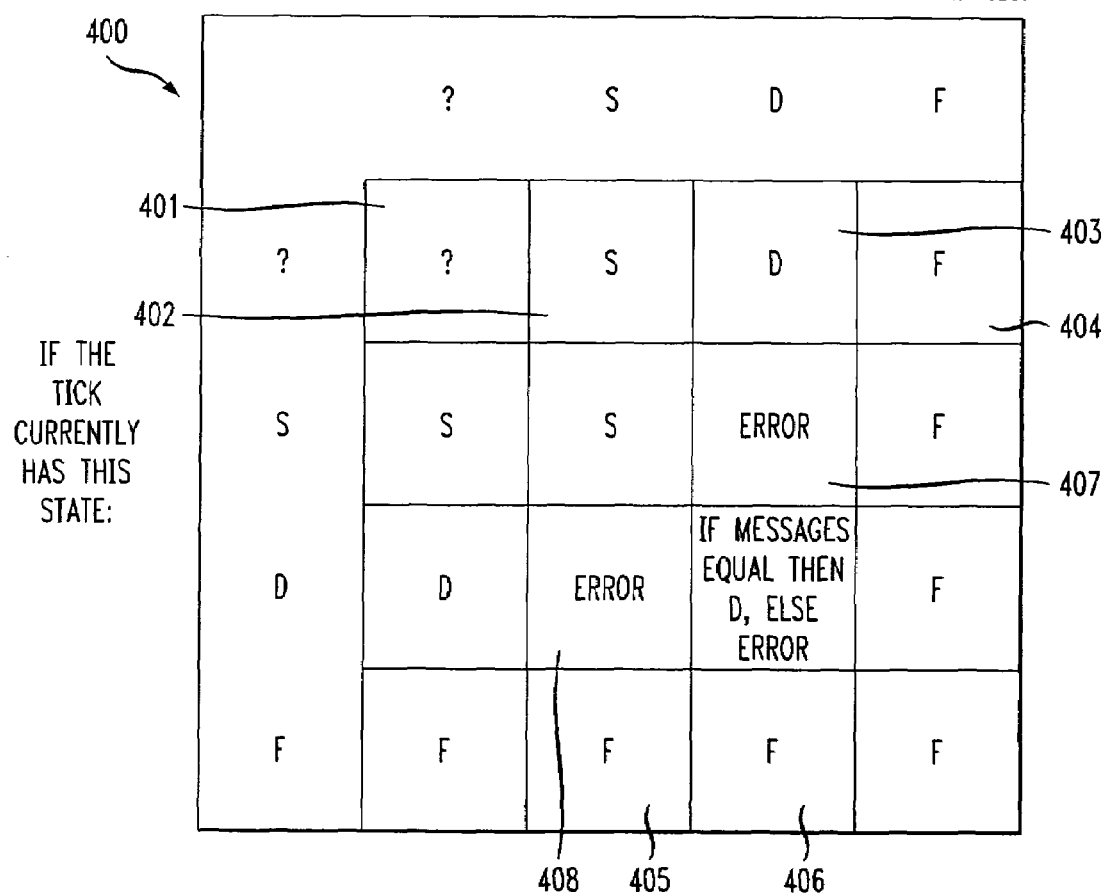
FIG. 4 is a table illustrating a set of exemplary rules governing how knowledge values delivered from an upstream transform or link are accumulated by a downstream knowledge stream, in accordance with the present invention.

FIG. 4 depicts a table 400 of exemplary rules to be applied to the information stream. It is to be appreciated that these rules are only illustrative, and that different and/or additional rules may be employed in accordance with the invention, as will be understood by those skilled in the art. All information streams preferably accumulate knowledge contained in messages by applying the illustrative rules shown in table 400. For example, a ? value for a current tick leaves the current state of the tick unchanged, as shown in cells 401, 402, 403 and 404. Therefore, ? ticks are preferably never explicitly sent. An F value turns the current state of the tick into an F, regardless of the value received by the information stream for that tick, as shown, for example, in cells 405 and 406. A current tick having an S or D value is ignored if the received value from the information stream for that tick is already F, saved if the value is ?, and is considered a duplicate if the value is already S or D. If it is not a duplicate, then it is considered an error that should never occur even during a failure situation, as shown in cells 407 and 408. The system may tolerate message losses and message duplications, but not such failures that may send one tick value during a given time and a different tick value during the same time.

Figure 5:
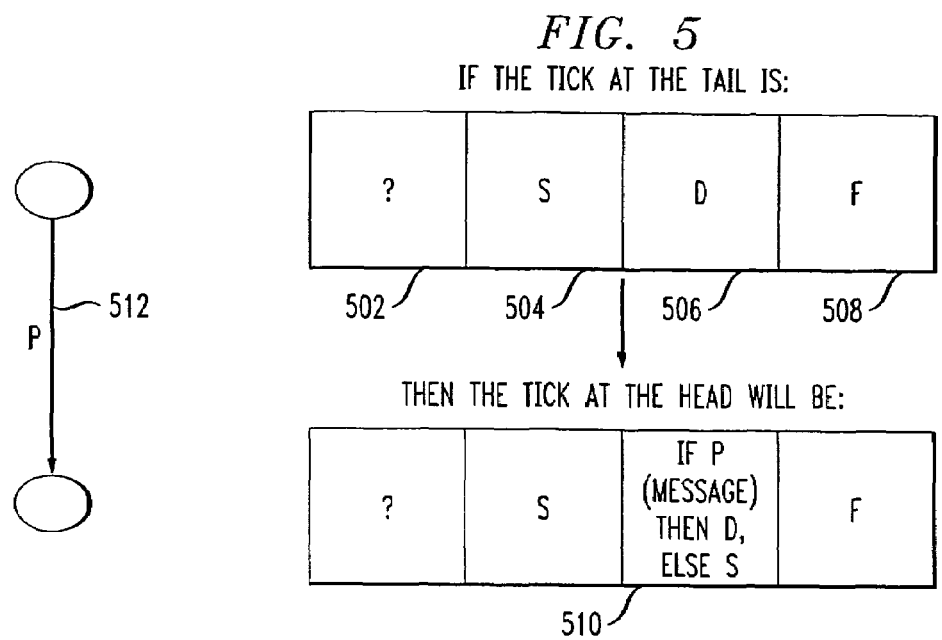
FIG. 5 is a graphical illustration of a set of exemplary rules governing how a filter transform propagates knowledge values to its downstream knowledge stream, in accordance with the present invention.

As previously stated, every transform in the broker network is either a filter, a link, or a merge. For a given filter, there is preferably a filter predicate P associated therewith. As shown in FIG. 5, a filter passes all ticks 502, 504, 506, 508 unchanged, except that D ticks (e.g., 506) containing data that do not match the filter predicate P (e.g., 512) are converted to S ticks, as shown in tick 510. If there is no predicate associated with a given filter, all ticks are passed unchanged, the same as a link would do. Thus, a link may be thought of as a filter with no predicate, except that rather than being implemented as a process within a broker, it is implemented as a connection between brokers. Links need not utilize FIFO connections, so they may be either implemented using more unreliable protocols, such as, for example, UDP, or over multiple parallel FIFO sockets.

Figure 6:
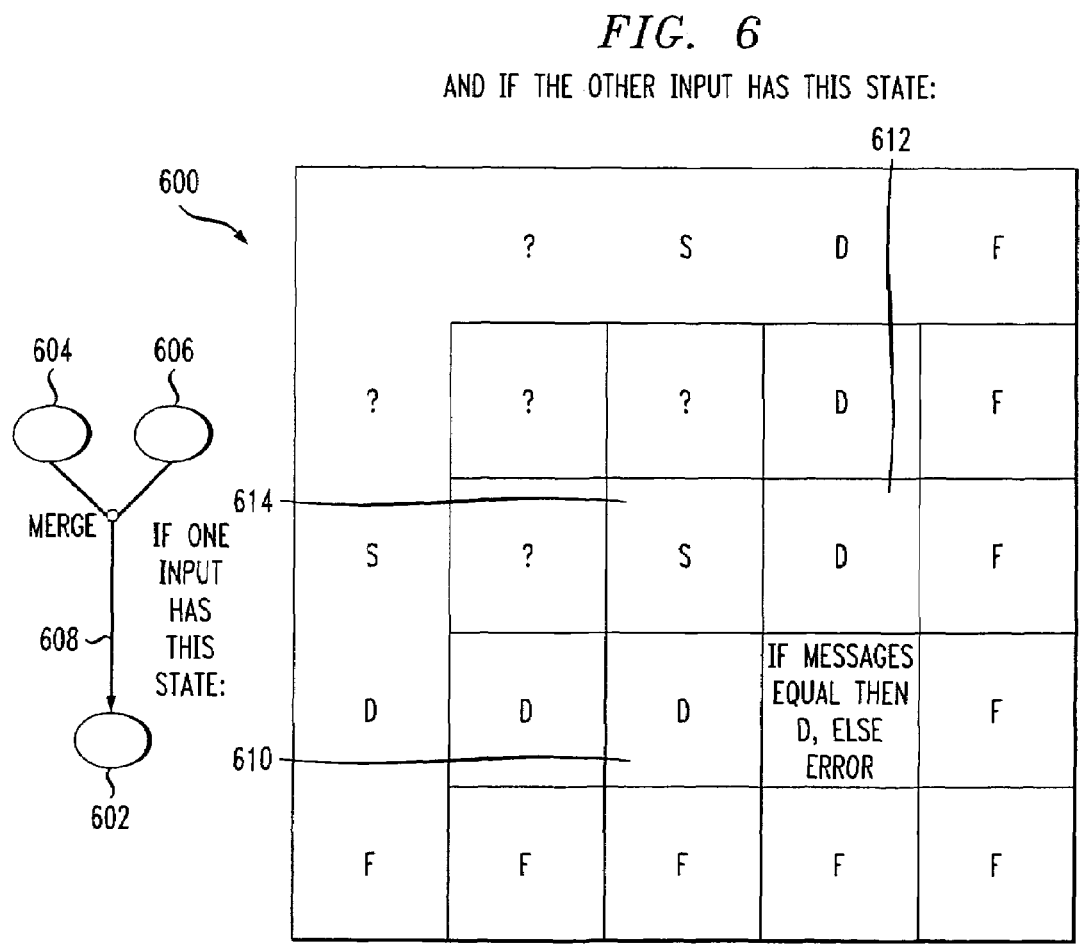
FIG. 6 is a graphical illustration of a set of exemplary rules governing how a merge transform propagates knowledge values from its upstream knowledge streams to its downstream knowledge stream, in accordance with the present invention.

In FIG. 6 there is shown an illustrative merge operation along with exemplary rules 600 for performing the merge. In a merge operation, a given node 608 receives as input two or more information streams 604, 606 and generates a single information stream 602 as output. One feature which makes a merge special is that it does not pass along silence unless all its inputs are silent. Thus, if one input information stream contains data and all others are silent, the resulting output information stream will be the data message. This is shown, for example, in cells 610 and 612 of rules table 600. Accordingly, data is passed eagerly and silence is delayed until all other inputs also show silence, as indicated in cell 614. As with knowledge accumulation, the same tick is preferably not allowed to have different data from multiple sources associated therewith (since a serious protocol error may result). There are various ways to design a system to insure that this never happens, as will be understood by those skilled in the art. For example, low-order bits of the tick can be used for encoding an identity of the pubend, and each pubend can be configured to publish data only at ticks with matching low-order bits, essentially guaranteeing silence at all ticks with non-matching low-order bits.

The above description has focused primarily on how knowledge propagation works in intermediate information streams and transforms, in accordance with the present invention. The following description will focus primarily on a more global picture of the publish/subscribe network of the present invention, detailing how messages published by publishing clients (pubend) arrive at subscribing clients (subend).

Figure 7:
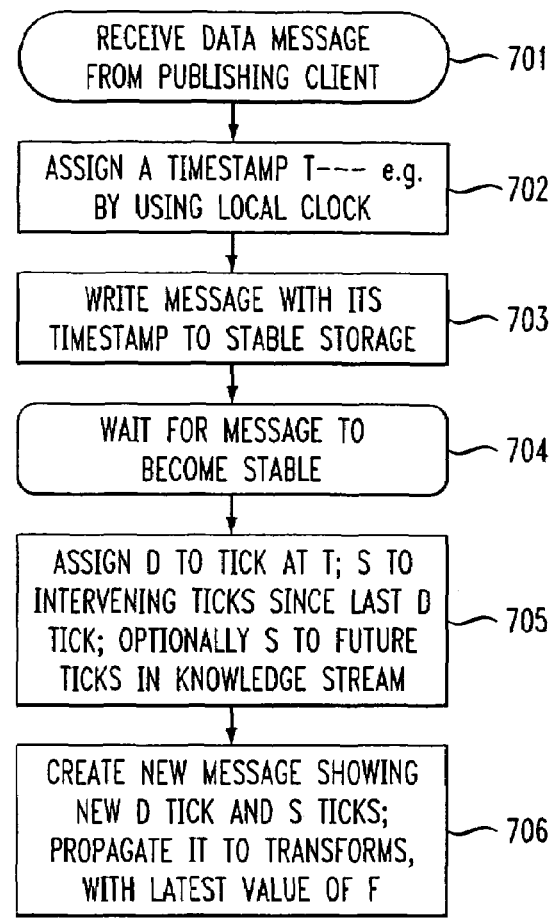
FIG. 7 is a logical flow diagram illustrating exemplary processing steps performed at a pubend information stream in response to receipt of a new message from a publishing client, in accordance with the invention.

Initially, when a publishing client sends a message, the message will arrive at a PHB which will associate the message, using some predetermined criterion, with a pubend in that PHB. The criterion employed is preferably conventional and generally not critical to the present invention. Therefore, a detailed discussion of such criteria will not be presented herein. FIG. 7 illustrates an exemplary processing methodology that may be performed for a given pubend, in accordance with the present invention. The processing of a data message by the pubend is initiated when the pubend receives the message in step 701. After receiving the message, the pubend will preferably assign a timestamp T to the message in step 702. Preferably, a clock is utilized to assign the timestamp, although alternative techniques may be used, provided the timestamp T at time t (e.g., T(t)) is later than a tick assigned a D or S value in a previous message (e.g., T(t−1)). The timestamp T will be the tick number of a D tick in the pubend information stream.

The message, together with its timestamp T, will then be written to a stable storage log in the PHB in step 703. The pubend preferably waits for an acknowledgment that the message has been logged in stable storage in step 704. If an acknowledgment is not received within a predetermined period of time, the pubend may generate an error message or rewrite the message and corresponding timestamp T to stable storage (not shown). Assuming the acknowledgment has been received, the pubend then updates its knowledge stream in step 705 by assigning D to the value of the tick at timestamp T, S to all ticks later than the previous D tick and earlier than timestamp T, and, optionally, assigning S to a range of future ticks promised to be S. These updates to the knowledge stream are then packaged into an original message (i.e., propagated from an information stream to all downstream information streams whose filters match the message, as previously described) in step 706. This message is then delivered to all the transforms whose arrowtails abut the given pubend.

Whenever a message enters a transform, the methodologies and rules described above in conjunction with FIGS. 5 and 6 are preferably executed for the appropriate transform. In this manner, messages will generally flow towards other downstream information streams.

Figure 8:
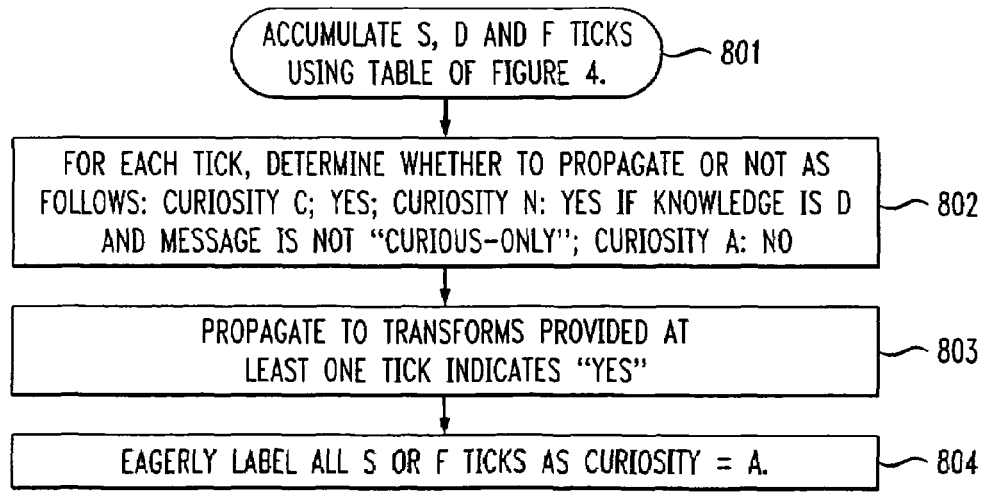
FIG. 8 is a logical flow diagram illustrating exemplary processing steps performed at each information stream when new knowledge arrives from upstream, in accordance with the invention.

FIG. 8 illustrates an exemplary processing methodology that may be performed when a message arrives at an intermediate information stream other than a subend, in accordance with the present invention. In step 801, knowledge contained in the message is preferably accumulated with the knowledge already included in the information stream, using, for example, the illustrative rules 400 depicted in FIG. 4 and described above. Step 801 may set a tick to D and other ticks to S and F. After the knowledge has been accumulated in step 801, we must next determine how to continue propagating the message.

Within a broker, the message is essentially always propagated. However, when a link is encountered, a set of rules is preferably imposed to determined whether or not the message should be sent over the link. Step 802 provides an exemplary set of rules that can be used to make such determination. For each changed tick, we propagate the message over a link provided: (i) any of the changed ticks has a curiosity state C, indicating that it is important to learn and propagate the message, as previously explained; or (ii) a D tick has curiosity state N, indicating a neutral state, as previously explained, and the message is original (i.e., not a "curious-only" message). If the tick has a curiosity state A, indicating anti-curious or acknowledged, as previously explained, the message is preferably not propagated over the link. In step 803, the message is propagated over the link if at least one of the appropriate conditions set forth in step 802 are present. The curiosity of S ticks and F ticks are preferably labeled as curiosity A in step 804. If we propagate a message, it is sent to all transforms that originate at the information stream.

The message continues through one or more steps of transform, accumulation, and/or propagation, until either a failure occurs or it arrives successfully at a subend. Procedures for handling message failures and recovery from such failures will be discussed in further detail below, in accordance with another aspect of the invention. For the present discussion, it will be assumed that there is no failure and that the message arrives correctly at the subend.

FIG. 9 illustrates an exemplary subend processing procedure, performed in accordance with the present invention. When a message arrives at the subend, the subend information stream is updated in step 901, preferably by accumulating knowledge contained in the message with the knowledge already included in the information stream, using, for example, the illustrative rules 400 depicted in FIG. 4. Step 901 is performed in a manner consistent with step 801 used for processing an intermediate information stream (see FIG. 8). However, each subend now preferably computes a number referred herein as a doubt horizon, as shown in step 902. The doubt horizon represents a known gapless range. That is, it is a time t such that no earlier tick has the value ? corresponding thereto. In step 902, the subend computes whether the new knowledge from the message it has just received advances the doubt horizon.

If the subend determines that the doubt horizon has advanced from some previous time value t1 to a later time value t2, then the subend is in a position to know that it is safe to queue for delivery all D messages after t1 and before t2. In step 903, the subend queues up all these D messages for delivery to a particular client(s). This delivery preferably takes place over the FIFO link to the client(s), where the messages will be received in the order sent by the subend, which matches the order of the D tick times. A parallel process in the subend waits for acknowledgments indicating that the clients have received the messages sent to them, as shown in step 911. For each such acknowledged D message, the corresponding tick is set to A.

The above discussion assumes that messages are not lost on links and that brokers do not fail. Even so, the computation of the doubt horizon allows for messages to be delayed and to arrive out of order from the links. However, we now describe methodologies for handling failures caused by, for example, broker and link failures. As previously stated, curiosity information associated with a given message may be used to indicate a curiosity state C (i.e., it is important to learn and pass down the value associated with a given tick corresponding thereto) or an anti-curiosity state A (i.e., it is not important to learn the value corresponding to the given tick). Curiosity information propagates in an upstream direction from subend to pubend and may be used to resend information lost due to broker and link failures.

Ticks can be set to particular curiosity, representing either curious C, anti-curious A, or neutral N states, as previously explained. An anti-curious state can be indicated in at least one of two ways: (i) ticks that are S values are intrinsically anti-curious; and (ii) ticks that are D values become anti-curious when all downstream clients who need them have already acknowledged receiving them. S ticks eagerly get a curiosity value of A assigned thereto. It was already shown in step 911 that each subend causes a D tick's curiosity value to become A when the client acknowledges receiving the message. This covers essentially all cases for setting the anti-curiosity A of a given tick.

FIG. 10 depicts exemplary methodologies for setting the curiosity of a given tick to curious C, in accordance with the present invention. As apparent from the figure, three illustrative mechanisms for initiating a C in a curiosity stream are shown as follows:

Each information stream preferably has a Gap Curiosity Threshold (GCT) corresponding thereto, generally defined in terms of a predetermined time period $t_{GCT}$ (e.g., in seconds). Whenever a gap is detected, which may be defined as one or more ? ticks between two non-? ticks, the information stream waits (i.e., curiosity is neutral N) for the predetermined time delay of $t_{GCT}$ corresponding to the gap curiosity threshold. If the gap persists for longer than that time, the ? ticks are marked as C in step 1001.

Each subend preferably has a Delay Curiosity Threshold (DCT) associated therewith, generally defined as a predetermined time period $t_{DCT}$ (e.g., in seconds). Whenever the delay between the time of the last non-? tick and the current real time exceeds $t_{DCT}$, the ticks following the last non-? tick through the next $t_{DCT}$ seconds are marked as C in step 1011.

If a curious tick is not satisfied (i.e., meaning that its knowledge state remains ?), then after the expiration of a Negative Acknowledge (Nack) Repetition Threshold (NRT), which may be defined in terms of a predetermined time period $t_{NRT}$ (e.g., in seconds), the curiosity state of the tick is preferably reset to N in step 1021. Step 1021 deals with the possibility that either the curiosity request or the retransmission was lost. Eventually, if the lack of knowledge persists, the curiosity state of the tick will be reset to C and another propagation of curiosity will occur.

It is to be appreciated that the mechanisms described above in conjunction with FIG. 10 are merely illustrative, and that alternative and/or additional methodologies may be similarly employed with the present invention, as will be understood by those skilled in the art.

Curiosity is preferably propagated via two types of upstream messages, namely an Acknowledgment (Ack) message and a Negative Acknowledgment (Nack) message. An Ack message corresponds to the prefix of ticks that are in a curiosity state A. (Note, that it is not necessary to send information about A ticks that are not in an all-A prefix.). A Nack message contains a range of ticks that are in a curiosity state C.

Figure 11:
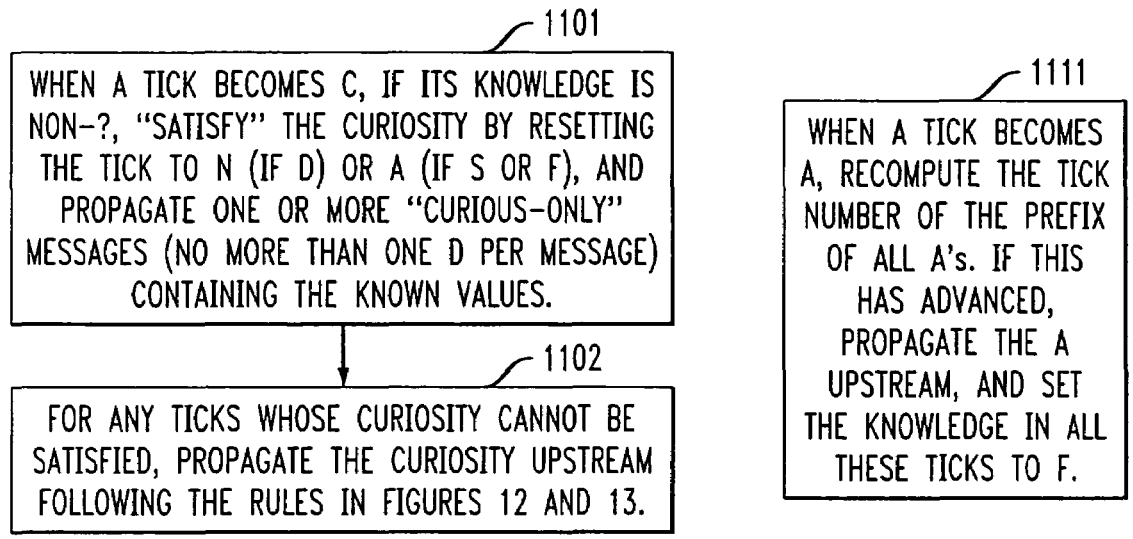
FIG. 11 is a logical flow diagram illustrating exemplary processing steps performed at information streams other than a pubend when curiosity information arrives from downstream, in accordance with the invention.

Whenever a tick becomes C at some information stream, the curiosity must either be satisfied, for example, by passing down a knowledge message for the range of ticks requested, or else the curiosity must be passed upstream through a transform whose arrowhead points to the information stream. FIG. 11 illustrates an exemplary methodology for propagating curiosity at information streams, in accordance with the present invention.

With reference now to FIG. 11, if the information stream has knowledge (i.e., non-?) for some range of ticks, the curiosity states corresponding to those ticks are preferably reset to N, for S or D ticks, and to A for F ticks, and one or more messages indicating that those ticks are now F, S, or D are propagated in step 1101. These messages are designated as curious-only messages. As previously stated, curious-only messages will not flow to all downstream subscribers, but only to those who subscribers that have expressed curiosity about those ticks. For any ticks whose curiosity cannot be satisfied (e.g., the knowledge stream contains no information (?) pertaining to those ticks), a curiosity message is propagated upstream in step 1102 in accordance with certain rules, which will be described in further detail herein below. This may result in creating multiple curiosity messages, in the case where a large range of ticks becomes C, and one or more smaller regions or subsets of that large range are satisfied and the rest unsatisfied.

In step 1111, whenever a tick becomes A, the information stream preferably recomputes the tick number of the prefix of all A ticks to determine whether there is now a longer prefix of all A ticks. When the number of the prefix of all A ticks has advanced (i.e., is longer), the entire range of knowledge ticks is set to F and a curiosity message specifying this new prefix is sent upstream (i.e., the A tick is propagated upstream).

Figure 12:
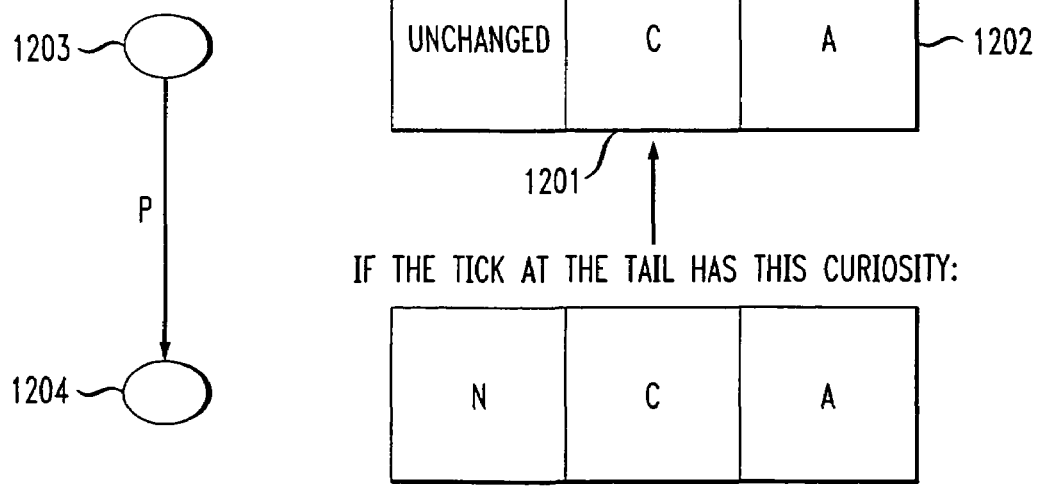
FIG. 12 is a graphical illustration of a set of exemplary rules governing how a filter transform propagates curiosity information upstream, in accordance with the present invention.
Figure 13:
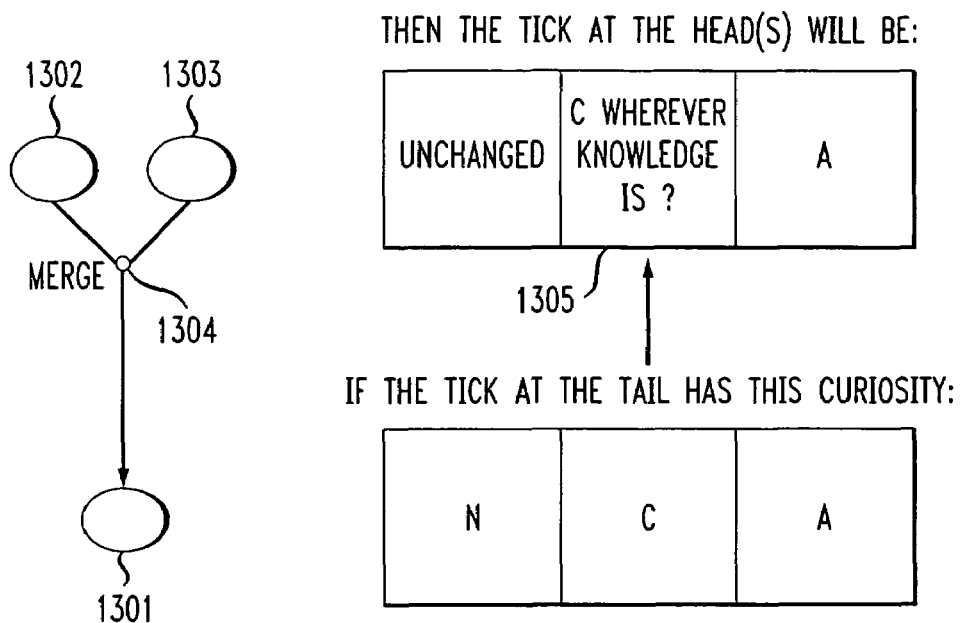
FIG. 13 is a graphical illustration of a set of exemplary rules governing how a merge transform propagates curiosity information upstream, in accordance with the invention.

When a curiosity message is passed upstream, it is processed by transforms according to certain predefined rules. For example, FIG. 12 illustrates an exemplary set of rules for processing a curiosity message through a filter transform having a predicate P associated therewith, in accordance with the present invention. Likewise, FIG. 13 illustrates an exemplary set of rules for processing a curiosity message through a merge transformation, in accordance with invention. Recall that only information about curiosity states C and A are passed upstream. Information about curiosity state N state is essentially ignored.

As shown in FIG. 12, a filter transform preferably passes messages with curiosity states C and A at information stream 1204 upstream directly without change to information stream 1203, as shown in cells 1201 and 1202, respectively. As shown in FIG. 13, a merge transform 1304 preferably passes messages with curiosity state A from its output stream 1301 to all its input streams 1302 and 1303, but passes messages with curiosity state C only to those inputs where the knowledge state is ?, as shown in cell 1305.

After curiosity is passed upstream, the cycle of updating the curiosity, satisfying C where possible, and passing A and unsatisfied C upstream is repeated. The propagation of C terminates when all C ticks are satisfied, or when the pubend is reached. The propagation of A terminates when the prefix of all A ticks is not extended, or when the pubend is reached.

Figure 14:
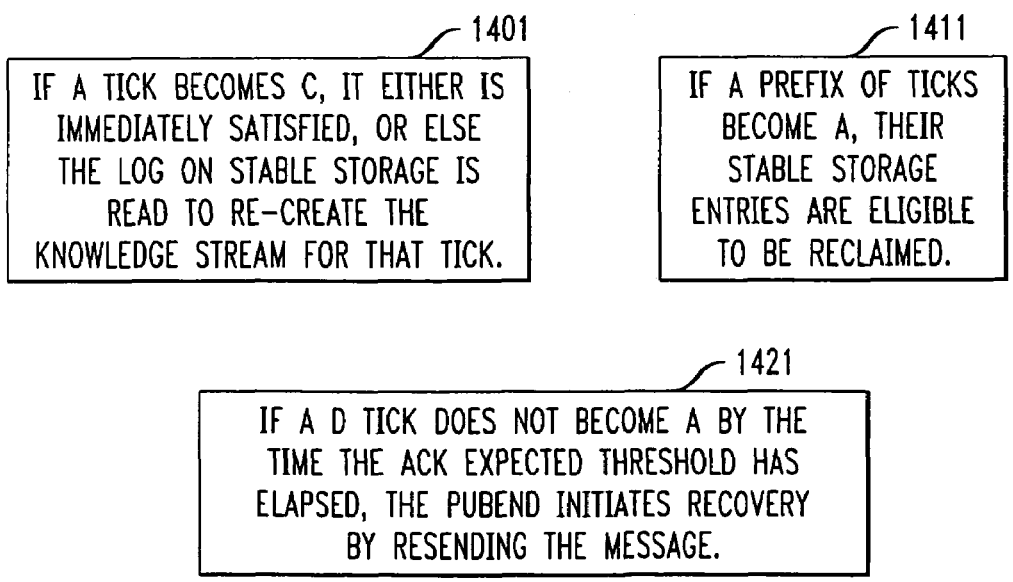
FIG. 14 is a logical flow diagram illustrating exemplary steps for processing curiosity information by a pubend, in accordance with the present invention.

The handling of curiosity states A and C by the pubend is different from all other information streams, as shown in FIG. 14. As apparent from the figure, when a tick becomes C at the pubend it must be satisfied. Either the pubend has the values in its information stream, or else (e.g., as a result of a pubend failing and losing this information) it has the values stored in its log in stable storage, as shown in step 1401. Either way, there is enough information to satisfy the C ticks. When a prefix of ticks becomes all-A at the pubend, every subscriber downstream who may have needed the value of the ticks has already received it. This implies that the log entries corresponding to these ticks can be reclaimed (step 1411). If a C value is received for such a tick, then even though there is nothing in the log it is safe for the curiosity to be satisfied with the value F.

Optionally, the pubend can decide to be more proactive and not wait for Nack messages, but can decide that if a tick with knowledge value D does not receive an Ack message (i.e., curiosity A) within a predetermined period of time, defined herein as an Ack Expected Threshold, then the pubend will initiate recovery immediately by either resending the message or by prompting downstream brokers to send Nack messages, as shown in step 1421.

Broker and Link Failures

There are various mechanisms for detecting link failures, as will be understood by those skilled in the art (e.g., intermittently "pinging" the session partner if no data has been received). When a link fails, its connection is preferably re-established using conventional means. Although messages may have been lost as a result of the failure, the lost messages will either trigger a Delay Curiosity Threshold or a Gap Curiosity Threshold, previously described, and the lost messages may be recovered using the techniques of the present invention described herein.

When a broker fails, all its data structures are generally lost, except the stable logs associated with the PHBs. Such a failure is detected by a system administrator and the broker, or a new machine configured to replace the failed broker, is restarted. The information flow graph (e.g., FIG. 2) is then restored by the system administrator, or by alternative means. The data structures are preferably reset with a value of all ? for its knowledge stream and all N values for its curiosity stream. The information flow graph is used to re-establish link connections. Eventually, the protocols described above will detect whether any messages were lost during the failure period and the curiosity messages will cause such lost messages to be retransmitted and recovered.

Consolidation of State at Subend Hosting Broker (SHB)

In accordance with the present invention, each subscriber connects to a particular broker (different subscribers can connect to different brokers) called the SHB. The subend for a subscriber is part of the SHB and the SHB preferably consolidates state across multiple subends for efficiency. For instance, in a deployment with no merge operators, the methodology previously described keeps one knowledge stream and one curiosity stream at each subend for each pubend. The present invention, in another aspect, is preferably configured to consolidate these streams, wherein the SHB includes one knowledge and one curiosity stream for each pubend, regardless of the number of subends. A reliable protocol, such as, for example, TCP/IP, may be used on the last hop between the SHB and the subscriber, and messages are acknowledged as soon as they are sent on this last hop. No acknowledgments are sent from the subscriber to the SHB. This approach advantageously increases scalability and allows an SHB to host a greater number of subends (e.g., more that 15,000 subends).

When a new subscriber connects to an SHB, a subend is created and the SHB decides on a starting point for this subscriber that is greater than what it has already acknowledged. To do this, the SHB preferably maintains two data structures, namely, "safe" and "seen," each of which includes a timestamp for pubends known to this broker. The starting point for a new subscriber for messages from pubend p is seen[p]. The value safe[p] represents the highest timestamp that the SHB has acknowledged to pubend p and is preferably maintained in persistent storage. The value seen[p] represents the highest timestamp from pubend p seen by this SHB, and is preferably maintained in volatile storage. A protocol which may be used to initialize safe[p] for the first time is described below. Once safe[p] is initialized, failure recovery of the SHB is preferably handled by initializing seen[p] equal to the persistent safe[p] value.

Section 2 below describes some exemplary protocols for implementing the durable message stream (DMS) service, assuming that subends are located in the SHBs. These protocols continue to consolidate most stream state across subends.

2. Durable Message Streams

The present invention described above preferably maintains a subend for each subscriber that is connected to an SHB. However, a subscriber that disconnects from the broker network is essentially forgotten and must reconnect as a new subscriber. This process causes the subscriber to lose messages that may have been published while it was disconnected. In accordance with another aspect of the invention, the broker network described herein is preferably configurable to extend the gapless delivery methodologies of the present invention, as previously described, to provide a durable message stream (DMS) service that supports durable subscriptions/subscribers (DS). This DMS service allows a given subscriber to reconnect to the broker network at will and resume, without gaps, from the point at which it disconnected. Furthermore, the DMS service preferably allows a given subscriber to reconnect at any SHB in the network.

A subscriber is assigned a unique subscription identifier, referred to herein as a subid, and maintains a checkpoint token" that specifies its filter and the point in time till which it has received and processed messages. A reconnecting subscriber provides the SHB its subid and checkpoint token so that the SHB can deliver messages from the point in time when it disconnected. A durable subscriber preferably periodically releases messages, which allows the broker network to appropriately discard messages that are no longer needed. A properly functioning durable subscriber presents a checkpoint token that is always greater than or equal to what it has released.

To guard against durable subscribers that may not reconnect, or that do not release messages, a system administrator may specify a predetermined maximum retention time, such that messages that are older in time than the predetermined maximum retention time are reclaimed.

First, certain terminology and concepts relating to durable message delivery will be described in more detail. This terminology is merely illustrative and is intended to clarify the description of the present invention. It is to be appreciated that different and/or additional terminology may be used in conjunction with the present invention, and that such terminology is in no way intended to limit the scope of the invention. Next, a durable message delivery methodology will be described in more detail, in accordance with the present invention. The description below assumes no merge operations. However, the durable message delivery methodology of the present invention can be easily configured to handle such merge operations using, for example, the merge techniques previously described (e.g., in conjunction with FIG. 6), as will be understood by those skilled in the art.

Terminology

Vector Clocks and Time

Vector clocks containing an entry per pubend are preferably used for representing information and/or events at various points in time, such as what information a certain subscription has released, what information a particular SHB has seen, etc. Vector time is preferably represented as a finite set of pubend, timestamp pairs, such as, for example, $$\{(p1, t1), (p2, t2), \ldots, (pk, tk)\}$$

where $k \geq 1$ and (pk, tk) represents an ordered pair of pubend pk and corresponding timestamp tk.

For a given vector clock T with the above value, a timestamp pi is preferably accessed, for example, using an array index operator, T[pi], where $i \geq 1$, and is assigned a corresponding time value ti as follows:

Set $T[pi] = ti$

A special timestamp ⊥ is preferably used to represent an unknown value in some clocks.

New pubends can be created, so it is possible that vector clock T does not explicitly include a pubend, timestamp pair (p, t) for some pubend p. In such case, T[p] will be set to zero (0). Thus, a vector clock/time is complete, meaning that it represents a timestamp t for each pubend p in a universal set, U_p, of pubends. Since the pubends that may be created in the future are not known, the set U_p is, in practice, not enumerable. However, it is convenient, for ease of explanation, to consider set U_p to be enumerable since it allows finite data structures to have values corresponding to each pubend in the set U_p.

Checkpoint Token

A checkpoint token (CT) preferably stores the following information associated with a particular subscription:

1. Vector Clock (T): This represents what messages the subscription has received. For all $p \in U\_p$, $CT.T[p] \neq \perp$
2. Selector/Filter (f): This represents a particular content selector associated with a given subscription.

Administrative Retention

Administrative retention values, for example, minRetain and maxRetain, are preferably defined for each pubend. The minRetain property allows new subscriptions to request messages in the past, while maxRetain is used to limit the maximum resources consumed at a particular pubend, for example, by forcibly discarding/reclaiming a message even if there are some current durable subscribers that may still be interested in the message. Forced reclamation of a message does not override the gapless delivery reclamation condition (i.e., a message can only be reclaimed if it has been acknowledged (turned into an F value), as previously stated).

In general, both minRetain and maxRetain preferably define a particular time interval. Alternatively, minRetain and maxRetain may be expressed as a bound on some resource, such as, for example, persistent storage. For ease of explanation, it will be assumed that minRetain and maxRetain are time intervals, with minRetain $\leq$ maxRetain.

Gap Notifications

Because a message may be forcibly discarded by a pubend (e.g., if the time interval maxRetain is exceeded), it is virtually impossible to make a guarantee, in the general case, that a durable subscription will not see any gaps in the message stream. When a gap does occur, the system preferably explicitly notifies the subscription of such gap so that it can take any application-specific action(s) necessary (e.g., it could unsubscribe from the broker network). In addition, a new durable subscription (not a reconnecting durable subscription) that explicitly asks for messages in the past, referred to herein as providing an explicit start point (ESP), may receive an initial-gap notification if the system cannot handle the request at that time.

The system preferably makes the following guarantees for a special case when [minRetain, maxRetain]=[t, ∞]:

> For a DS without an ESP, there will be no gap notifications.
> For a DS with an ESP, there will be at most one initial-gap, and no gap notifications after that.

Retain-Broker and Home-Node for a Durable Subscription

Messages must be retained for disconnected DSs and released when they are no longer needed. A distributed protocol involving all SHBs is preferably employed for message retention and release, in accordance with the invention. In this distributed protocol, SHBs maintain vector clocks in persistent storage, representing what information a particular DS has released. An SHB maintaining such a vector clock for a subscription s, where s is the subscription identifier (subid), is referred to herein as a retain-broker for subscription s. Messages are exchanged to manage which SHB is the current retain-broker for s, to converge to a single retain-broker for s, and to cleanup persistent storage after subscription s unsubscribes from the network.

The distributed protocol preferably employs a coordinating entity that is stationary, and can be located using the subid s. This coordinating entity is referred to herein as the home-node for s. Home-nodes may be partitioned by subids (e.g., for scalability) and can be replicated (e.g., for high availability). This distributed protocol is described in further detail below.

Admitting Pubends at an SHB

There are at least two cases for admitting pubends at an SHB, in accordance with the invention:

1. An SHB coming up for the first time is given a list of pubends currently in the network (e.g., currentPubendsList) by an administrator of the network. It initializes two persistent vector clocks, namely, safe and released. As previously explained, safe[p] represents what information the SHB has acknowledged in connection with pubend p. Similarly, released[p] represents what information the SHB has released. For all pubends p∈currentPubendsList, safe[p] and released[p] are preferably initialized to an unknown value ⊥. A request-response protocol, which will be described in further detail below, can be used to initialize safe[p] and released[p] for such pubends. For all pubends p∈U_p—currentPubendsList, safe[p] and released[p] are preferably set to zero.

2. An SHB recovering from a failure preferably initializes safe[p] and released[p] from persistent storage, and only performs the request-response protocol for pubends p such that released[p] or safe[p] are equal to ⊥. This may occur, for example, when the initialization procedure did not complete before its last failure.

Any pubend p, wherein safe[p] or released[p] is equal to ⊥, is not yet admitted by the SHB. Messages from a pubend that are not yet admitted are ignored, and therefore not delivered to a subscription that may be interested in them. This does not delay the delivery of messages from admitted pubends to the same subscription. An SHB delays accepting new subscriptions, with or without an ESP, until all pubends p∈U_p are admitted.

Durable Message Delivery

Techniques will now be discussed for generalizing the gapless delivery (GD) routing protocol previously described to handle durable subscriptions, in accordance with the present invention. Conceptually, routing essentially involves at least two concurrently active protocol systems. In a first protocol system, a primary-tree (PT) preferably runs the protocol specified in the GD (Gapless Delivery) design, and is used for the distribution of new messages (e.g., messages that have not been acknowledged). In a second protocol system, a secondary-tree (ST) preferably runs a protocol used for retrieving old messages, and employs no acknowledge messages.

Durable subscribers that are retrieving messages from the ST are considered to be operating in a "catchup" mode. Since messages that have been acknowledged (i.e., turned into F) may still be needed at a later time by disconnected durable subscribers, we extend the definition of F slightly from the GD protocol and define another knowledge value, L. The PT maintains knowledge streams that have ?, S, D and F knowledge values, as before. Recall that the F value indicates that the corresponding D value (note that an S can always be turned to an F) has been delivered on the PT to all normal subscribers and durable subscribers who are not operating in the catchup mode.

The ST maintains knowledge streams that have ?, S, D and L knowledge values. The L value indicates that information corresponding to this tick has been discarded by the pubend, because it had been turned to F and either all durable subscribers have released it (implying that they do not need any information for that tick) or the administrative maxRetain interval has elapsed. A methodology employed for releasing messages by subscribers (i.e., changing tick values to L) and how these release operations are propagated upstream to the pubend is, for example, a release protocol. An illustrative release protocol will be described in further detail below.

The protocol running on the ST is preferably completely separate from the PT protocol. However, it is possible to unify the two protocols for improved performance. One way in which this can be accomplished will be described in more detail herein below.

The information stream at a given pubend is preferably comprised of a prefix of L values, followed by a sequence of S and D values, and a suffix of ? values, where the L values represent ticks that have been discarded due to an administrative retention policy, as previously described.

The latest L value is at timestamp T_L. The notion of a prefix of F values is represented by the time of the latest F value at timestamp T_F. The acknowledgments collected on the PT are used to advance timestamp T_F. The following invariant is preferably maintained at the pubend:

$$T\_L \leq T\_F$$

A broker preferably maintains information streams for the ST whose function is similar to their counterparts on the PT. The ST preferably runs a pure negative acknowledgment (Nack) protocol. Consequently, there are no A and F ticks in the stream.

Message types that flow on the ST are value, silence and Nack messages. There is no final prefix timestamp in value and silence messages. Since all value and silence messages are sent in response to Nacks, all messages are marked as "curious-only."

The processing which occurs upon receipt of each message in the DMS protocol is consistent to the processing which occurs in the GD protocol. One difference between the two protocols, however, is in the types of ticks that are stored in the knowledge streams and their corresponding accumulation and filter operators.

Specifically, in the DMS protocol, a knowledge stream contains tick values ?, S, D and L. There is no F state. Thus, an accumulation of information (i.e., knowledge propagation) in the DMS protocol is preferably accomplished using an accum operator which employs the rules set forth in Table 1 below, replacing the knowledge propagation rules described above in connection with FIG. 4:

TABLE 1

| Accumulate (accum) | | | | |
|---|---|---|---|---|
| | ? | S | D | L |
| ? | ? | S | D | L |
| S | S | S | err | L |
| D | D | err | D | L |
| L | L | L | L | L |

As apparent from Table 1, a primary difference between the knowledge propagation rules depicted in FIG. 4 and the rules defining the accum operator is that F ticks are replaced by L ticks. Filtering rules for the DMS protocol, which replace the filtering rules previously discussed in connection with FIG. 5, are set forth below. We also introduce rules for "forgetting" in the DMS protocol, wherein all ticks are changed to ? values, as shown below.

Filtering
? → ?, S → S, L → L,
D → S (if D does not pass the filter)
D → D (if D passes the filter)
Forgetting
D → ?, S → ?, L → ?

The protocols running on the PT and ST have been presented thus far as separate entities with their own respective data structures and messages associated therewith, but with the trees (PT and ST) rooted at the same pubend. This separation can result in redundant storage of information and redundant transmission of value, silence and Nack messages. As previously stated, the protocols running on the PT and ST can be unified into a single protocol, thereby eliminating such redundant processing and/or storage.

In accordance with a preferred embodiment of the invention, the corresponding knowledge streams are combined into one stream which represents information included in both. The combined knowledge stream preferably comprises only ?, S, D, and L ticks, but along with this tick information the combined knowledge stream also maintains a T_F value, which is the timestamp of the highest tick that has been turned to F in the original GD knowledge stream running on the PT. A unified accumulate operator, uaccum, preferably takes pairs <stream1, T1_F> and <stream2, T2_F>, and produces a <stream3, T3_F> pair, where:

stream3=stream1 accum stream2; and $$T3\_F = \max(T1\_F, T2\_F)$$

In the above expression, the accumulate operator accum is the same as that described in Table 1 above. The operator max returns either the value of T1_F or T2_F, whichever is larger.

Filtering <stream1, T1_F> to produce <stream2, T2_F> follows the filtering logic presented above to compute stream2 from stream1, and in addition T2_F is set equal to T1_F. Forgetting in the knowledge stream follows the forgetting logic presented above, and timestamp value T_F can be safely decreased.

Value and silence messages, in addition to the finalPrefix, also include an L prefix. They are interpreted as a <stream, T_F> pair, where timestamp T_F is preferably equal to the finalPrefix value in the message.

With regard to curious streams, the C ticks in the curious streams for the protocols running on the PT and ST are different in at least the following ways:

On the PT, a C tick can be satisfied if a corresponding knowledge tick is an F, D, or S value. With the combination of the knowledge streams, this condition is preferably stated as follows: A C tick at time t can be satisfied if the knowledge stream has a D or S value at time t, or timestamp T_F≧t.

On the ST, a C tick at time t can be satisfied if the corresponding knowledge stream has a D, S, or L value at time t. Since an L tick at time t implies timestamp T_F≧t, the information required to satisfy a C tick on the ST is more than what is required on the PT.

This suggests one methodology for combining the curious streams as follows:

A curious stream has N, $C_P$, and $C_S$ ticks, where N, as previously explained, represents a neutral tick, $C_P$ represents a curious tick on the PT and $C_S$ represents a curious tick on the ST. These ticks are preferably arranged in the following total order in terms of information requested:

$$N \rightarrow C_P \rightarrow C_S$$

A Nack message with a $C_S$ tick changes an N or $C_P$ tick to a $C_S$ tick, and a Nack message with a $C_P$ tick changes an N tick to a $C_P$ tick, but does not change a $C_S$ tick. There are no A ticks in a curious stream since they represent information that is already contained in the T_F timestamp value of the corresponding knowledge stream.

Release Protocol

The process of turning a certain timestamp in the pubend stream into an L value is referred to herein as "releasing" the message at the timestamp, and a methodology for doing this is referred to herein as a "release protocol." First, pubend and intermediate broker protocols will be described. Next, an SHB protocol will be described.

Pubend Protocol

Recall that T_F≧T_L, indicating that a message that has not been acknowledged cannot be released. A given pubend, p, preferably maintains two timestamp values, which may be defined as follows:

expiration threshold (ET)—All messages less than or equal to the timestamp value ET should be released only if there are no subscribers (durable or otherwise) interested in the message. The value ET can be calculated as follows:

ET=min(current time−minRetain, T_F), where minRetain is a minimum retention time specified for releasing messages, and min is an operator which returns the lesser of the quantity (current time−minRetain) and the timestamp value T_F.

absolute expiration threshold (AET)—All messages less than or equal to the timestamp value AET should be released even if the messages are needed by some durable subscribers. The value AFT can be calculated as follows:

AET=min(current time−maxRetain, T_F), where maxRetain is a maximum retention time specified for releasing messages.

If ET is negative, then no ticks have yet been turned into L ticks, and if AET is negative, no ticks have yet been forcibly turned into L. Since maxRetain≧minRetain, by definition, AET≦ET. The pubend may have a certain granularity T_G associated therewith, with which it tries to discard/release messages. After the elapse of every T_G time interval, the pubend preferably performs the following steps:

1. recalculate the values of ET and AET. If AFT has advanced and is greater than T_L, turn all ticks up to AET to L and set T_L=AET.
2. If ET is greater than T_L, send a request-for-release(p, t) message for requesting a release of the message, where t=ET, that flows down the tree to all SHBs. If a release-reply(p, t) reply is not received from a child in the tree, it resends the request-for-release(p, t) message with a predetermined frequency. This resending ceases when a T_G interval expires, since the ET value will be recalculated and these steps repeated.

If the pubend receives a release-reply(p, t') message, where t'>T_L, it turns all ticks up to time t' into L and sets T_L=t'.

Intermediate Broker Protocol

An intermediate broker preferably maintains the following timestamp values in non-persistent storage:

orelease(p, j)—For each child broker Cj, orelease(p, j) represents the highest timestamped release-reply message received from this child.

irelease(p)—This is equal to min(orelease(p,j)), for all j (invariant I1).

Release-reply messages are propagated up (i.e., towards the pubend) after an expiration of a release propagation threshold (similar to an Ack propagation threshold for Ack messages). The intermediate broker reacts to messages as described below in pseudocode representation.

Receipt of Request-for-Release(p, t) Message

1. If t≦irelease(p), then schedule a release-reply(p, irelease(p)) message to be sent upstream;
2. Else, for all j, such that orelease(p, j)<t, send the request-for-release(p, t) message to child broker Cj.

Receipt of Release-Reply(p, t) from Child Broker Cj

1. If t>orelease(p, j)
    a. set orelease(p, j)=t
    b. update irelease(p) to satisfy invariant I1 and if irelease(p) has increased, schedule a release-reply(p, irelease(p)) message to be sent upstream.

SHB Control of Message Release

We now describe how the SHB determines which messages it can release, in accordance with the present invention. The main protocol manages how an SHB becomes a retain-broker for a subscription s. The protocol attempts to make the current SHB, to which subscription s is connected, the retain-broker for s. But until the current SHB can become the retain-broker, it assumes that there is already some SHB in the system performing that role, and which will continue performing that role until it is told otherwise.

We start by describing certain data structures maintained at the SHB that are relevant for message release, and how they are initialized. It is to be appreciated that these data structures are merely illustrative, and that different and/or additional data structures may be employed with the invention, as will be understood by those skilled in the art.

Data Structures and Initialization

By way of example only, the SHB preferably maintains the following data structures:

admitted—This is a vector of booleans, including, for example, admitted[p]=true indicating that pubend p has been admitted and admitted[p]=false indicating that pubend p has not been admitted.

safe, seen—These are vector clocks, with safe[p] representing an upper bound on the timestamp that the SHB has acknowledged, and seen[p] representing the highest timestamp that the SHB has seen. The safe vector is maintained in persistent storage, to aid in quick recovery from a failure. These vector clocks preferably satisfy the following properties:

1. admitted[p]⇒safe[p]≠⊥ and seen[p]≠⊥.
2. admitted[p]⇒safe[p]≦seen[p]
3. safe[p] is monotonically increasing (across failures)
4. seen[p] is monotonically increasing while the broker is up and functioning.

released, relreq—These are vector clocks, with released[p] representing an upper bound on what an SHB has released, and relreq[p] representing what pubend p has requested to release. The released vector is maintained in persistent storage. These vector clocks preferably satisfy the following properties:

1. admitted[p]⇒released[p]≠⊥ and relreq[p]≠⊥.
2. admitted[p]⇒released[p]≦relreq[p]
3. released[p] is monotonically increasing (across failures)
4. relreq[p] is monotonically increasing while the broker is up and functioning.

released(s)—This is a vector clock which is maintained for each subscription s for which this SHB is the retain-broker. It is maintained in persistent storage. This vector clock preferably satisfies the following properties:

1. ∀ p, released(s)[p]≠⊥; where "∀" is a conventional representation meaning "for all" (i.e., the expression "∀ p, released(s)[p]≠⊥"means "for all pubends p, vector clock released(s)[p] is not equal to unknown").
2. ∀ p, released(s)[p] is monotonically increasing (across failures).
3. ∃ p, admitted[p]=false⇒this SHB is not the retain-broker for any subscription s; where "∃" is a conventional representation meaning "there exists" (i.e., the expression "∃ p, admitted[p]=false⇒" means "if there exists any pubend p such that vector clock admitted[p]=false, this implies . . . "). Therefore, admitting all pubends is a prerequisite to becoming the retain-broker.

relrecv(s)—This is a vector clock which is maintained for each durable subscription s that is currently connected to this SHB, and represents what s has released. This vector clock preferably satisfies the following properties:

1. ∀ p, relrecv(s)[p]≠⊥.
2. ∀ p, relrecv(s)[p] is monotonically increasing.

If the SHB is also the retain-broker for s (i.e., it is maintaining released(s)), updates to relrecv(s) are periodically reflected in released(s). Thus, for all p, released(s)[p]≦relrecv(s)[p].

releasable—This is a vector clock which represents what is okay for this SHB to release based on which durable subscriptions it is the retain-broker of, and which durable subscriptions are currently connected to it. It always satisfies the following invariant:

releasable[$p$]=min(∞, released($s$)[$p$] for all $s$, relrecv($s$)[$p$] for all $s$)     (invariant R1)

The ∞ is used for the boundary condition where the SHB is not the retain-broker for any subscription and no durable subscription is currently connected to it. Note, that releasable [p] is non-monotonic, and can be less than released[p].

When the SHB, for example broker B, comes up (e.g., reconnects to the system), we consider two cases for initializing the data structures:

1. Broker B is coming up for the first time. In this case, it has no persistent state, and is provided a list of pubends, currentPubendsList. The data structures can be initialized as follows:

$\forall$ p∈currentPubendList, set admitted[p]=false;
    $\forall$ p∈U_p−currentPubendList, set admitted[p]=true;
    $\forall$ p, if not admitted[p], then set relreq[p]=released[p]=safe[p]=seen[p]=⊥;
    $\forall$ p, if admitted[p], then set relreq[p]=released[p]=safe[p]=seen[p]=0;
    $\forall$ p, set releasable[p]=∞.

2. Broker B is recovering from a failure. In this case, the released, safe, and released(s) vector clocks are read from persistent storage, and the other data structures can be initialized as follows:

$\forall$ p, if (safe[p]=⊥ or released[p]=⊥), then set admitted[p]=false,
      else set admitted[p]=true;
    Set relreq=released;
    Set seen=safe;
    Initialize releasable to satisfy invariant R1.

Admitting Pubend p

After the initialization step, there can still be pubends p, such that admitted[p]=false. A request-response protocol is preferably used to retrieve an appropriate safe[p], released[p] value for pubend p. A pubend responds to a safe[p] request by sending the timestamp of the latest message it has published, and responds to a released[p] request by sending the timestamp of the latest request-for-release message it has sent.

While broker B tries to admit pubend p, it will continue to receive value and request-for-release messages from p. Such messages are acknowledged, or release granted, so that B does not hold up storage recovery at the pubend. This methodology is described in greater detail below in pseudocode representation:

```
Received value message with timestamp t
If (seen[p]=⊥) or (seen[p] < t) {
    Set seen[p]=t
    Schedule ack with timestamp t
}
Received request-for-release(p, t)
If (relreq[p]=⊥) or (relreq[p] < t) {
    Set relreq[p]=t
    Schedule release-reply(p, relreq[p])
}
```

Finally, broker B will receive a reply to its request for safe[p] and released[p]. Let the returned values be T_sp, T_rp, where T_sp represents the timestamp associated with safe[p] and T_rp represents the timestamp associated with released[p]. This methodology is described in greater detail below in pseudocode representation:

```
Received T_sp, T_rp

If (relreq[p]=⊥)
    Set relreq[p]=T_rp
```

```
Received T_sp, T_rp

Else
    Set relreq[p]=max (relreq[p], T_rp)
If (seen[p]=⊥)
    Set seen[p]=T_sp
Else
    Set seen[p]=max(seen[p], T_sp)
Set Safe[p]=seen[p]
Set Released[p]=relreq[p]
Set admitted[p]=true
```

Releasing Messages for an Admitted Pubend p

When the SHB receives a request-for-release(p, t) message, it preferably performs the following illustrative steps, in pseudocode representation:

```
If (relreq[p] < t)
    Set relreq[p] = t
If (t <= released[p]) {
    Send release-reply(p, released[p]) // resend
}
Else if (releasable[p] > released[p]) {
    // can release more messages
    Set released[p] = min(relreq[p], releasable[p])
    Send release-reply(p, released[p])
}
```

Becoming a Retain-Broker for a Subscription s

An exemplary protocol performed by an SHB to become the retain-broker for a subscription s currently connected to it, and to eventually cleanup persistent state for a subscription, is described below in accordance with one aspect of the invention.

Initialization of Relrecv(s)

As previously stated, broker B preferably maintains a relrecv(s) vector clock for each durable subscription that is currently connected to broker B. This value is advanced using releases received from a client. Here we describe an exemplary procedure for how it is initialized when s connects to broker B, in accordance with the present invention. There are at least two cases for initialization as follows:

1. Subscription s is a new subscription—In this case, the SHB blocks until all pubends are admitted. Then, the SHB checks which of the following cases apply to this subscription:
    a. Subscription s specified an explicit start point (ESP) using a checkpoint token CT (called CTapp):
        $\forall$ p, set relrecv(s)[p]=max(CTapp.T(s)[p], relreq[p])
        Note, in this instance we are preventing a new subscription from receiving messages that the pubend has requested to release.
    b. Subscription s did not specify a starting time or checkpoint:
        $\forall$ p, set relrecv(s)[p]=seen[p]
2. Subscription s is a reactivating subscription—Let CTapp be the checkpoint provided by the subscription.
    $\forall$ p, set relrecv(s)[p]=CTapp.T[p]

Precondition for Becoming Retain-Broker for Subscription s

The retain-broker for subscription s is responsible for preventing messages not released by s from being discarded. Since subscription s can move from one SHB to another, the illustrative methodology of the present invention converges to exactly one retain-broker for s, which is the latest broker to which s connected.

Let subscription s be currently connected to broker B. Broker B becomes the retain-broker for s when the following condition is true:

∀ p: admitted[p] and released[p]≦relrecv(s)[p]

Reconnect Count Using Dummy Pubend w

The protocol between a given SHB and a home-node, to become a retain-broker and eventually cleanup the released(s) state, preferably uses an approximately monotonic count that is incremented each time subscription s reconnects. This may be accomplished using a dummy pubend identifier (pubid) w, such that initially CT.T[w]=0. When s reconnects to some broker B, let CT.T[w]=i, where i is an integer representing a predetermined count. Broker B delivers a silence message to subscription s with a timestamp {(w, i+1)}, and substantially immediately (i.e., without waiting for the release from subscription s), advances relrecv(s)[w] to i+1. The relrecv(s)[w] value is used as a retain-broker version number, to decide which retain broker is the latest one. Due to the eager advancement of the relrecv(s)[w] value, this value at the previous broker, to which s connected, may have been higher than the relrecv(s)[w] value at broker B. To handle this, when broker B believes that it should be the latest retain-broker for s, because s is still connected to B, but broker B has been told that its version number is not the latest, it will again increment the value relrecv(s)[w], and thereby deliver silence to the subscription s. By repeatedly implementing the above procedure, broker B will eventually become the retain-broker with the highest version number.

Home-Node

A home-node for subscription s, which may be represented as home-node(s), is defined herein as an entity that maintains persistent information on behalf of subscription s and coordinates changes in retain-brokers, unsubscribe, etc. The home-node preferably maintains the following persistent information:
1. retain-broker(s)—This is the current retain-broker, at least as far as the home-node is aware.
2. retain-version(s)—This is the reconnect version number for this retain-broker.

The values retain-broker(s)=null and retain-version(s)=null may be used to represent no knowledge of subscription s by the home-node.

Point-to-Point Reliable Messaging

A point-to-point reliable communication layer is preferably employed for sending messages from a given home-node to an SHB, and vice versa. An exemplary interface supported by this communication layer is as follows:
1. SendAsync(destination, message)—This routine may return without a message being received by a particular destination. The function guarantees that if it returns, the message will eventually be received, even if the source and destination fail, when they eventually recover.
2. sendsync(destination, message)—This routine is a synchronous counterpart to the sendAsync routine described above, which guarantees that the message has been received and processed by the destination before it returns.
3. receive(message)—This is a callback routine for processing a message that is received. Only when the receive routine returns does the corresponding sendSync routine return. If the process fails in the middle of the receive routine, the callback routine will be called again (from the beginning) when the process recovers.

It is to be appreciated that different and/or additional interface routines may be constructed which are supported by the com munication layer, as will be understood by those skilled in the art.

Message Types

In accordance with the present invention, the following five illustrative message types may be used in the exemplary retain-broker protocol:
1. Create(s, b), where s is a subscription being created and b is a corresponding broker where the subscription s is being created. This message is sent from broker b to home-node(s).
2. AmRetainBroker(s, b, v), where s is a subscription, b is a broker claiming to be the retain-broker, and v is a reconnect version number. This message is sent from broker b to home-node(s).
3. NotRetainBroker(s, v), where s is a subscription and v is a reconnect version number. This message is sent from home-node(s) to a retain-broker.
4. Unsubscribe(s), where s is a subscription. This message is sent to home-node(s).

Creating Subscription s with Selector f, at B0

Let broker B0 be the first retain-broker for subscription s. The following exemplary steps are preferably performed at broker B0:
1. SendSync(home-node(s), Create(s, B0))—send a synchronous create message to the specified home-node.
2. Initialize relrecv(s) and set released(s)=relrecv(s).
3. Acknowledge that the subscription has been entered to the client.

If the client disconnects before step 3 is performed, broker B0 discards released(s).

At the home-broker, the following routine, in pseudocode representation, is preferably performed on receiving a create message:

```
receive(Create(s, B0)) {
    begin-transaction {
        Set retain-broker(s) = B0
        Set retain-version(s) = 0
    } end-transaction
}
```

Reconnecting s at Broker Bi

When a subscription s connects to a broker Bi, and s is not a new durable stream, it is possible that relrecv(s)<released. This is all right, however, since some other broker is currently the retain-broker, and broker Bi must wait until relrecv(s)≧released, before becoming the retain-broker.

If broker Bi is already a retain-broker for subscription s (i.e., it is maintaining a released(s) vector), it can immediately become the retain-broker. In this case, broker Bi sets $relrecv(s)[w]=\max(released(s)[w]+1, relrecv(s)[w])$ before performing the subsequent steps.

The following exemplary steps, in pseudocode representation, are preferably performed by broker Bi in order to become a retain-broker:

```
begin-transaction {
Set released(s)=relrecv(s)
    sendAsync(home-node(s),AmRetainBroker(s,Bi,released(s)[w])
} End-transaction
```

Unsubscribe s at Broker Bi

When a subscription s wishes to unsubscribe from a broker Bi, the following exemplary steps may be performed:
1. SendSync(home-node(s), Unsubscribe(s))
2. Send an Ack message to the client, acknowledging that the unsubscribe was successful.

Handling of Messages

The following exemplary steps, in pseudocode representation, may be performed for handling messages, in accordance with the present invention:

At home-node:

```
Receive ( Unsubscribe(s) ) {
    If retain-broker(s)<> null) {
        SendAsync (retain-broker(s),
                NotRetainBroker(s, ∞))
        Begin-transaction {
            // forget about s
            Set retain-broker(s), retain-version(s) = null
        } End-transaction
    }
}
Receive( AmRetainBroker(s, Bi, vi) {
    if (retain-broker(s) = null) {
        // have forgotten about s, so must have unsubscribed
        sendAsync(Bi, NotRetainBroker(s, ∞))
    }
    else if (retain-version(s) > vi) {
        // someone else with higher version is retain broker
        sendAsync(Bi, NotRetainBroker(s, retain-version(s)))
    }
    else {
        // tell the current retain-broker to stop being one
        SendAsync (retain-broker(s),
                NotRetainBroker(s, vi))
        Begin-transaction {
            Set retain-broker(s) = Bi
            Set retain-version(s) = vi
        } end-transaction
    }
}
```

At SHB broker Bi:

```
Receive( NotRetainBroker(s, v) ) {
    if (released(s)[w] <= v) {
        If (s is no longer connected) {
            Delete released(s)
        }
        Else { // retry
            Begin-transaction {
                Set relrecv(s)[w] = max(relrecv(s)[w] , v+1)
                Set released(s)[w] = relrecv(s)[w]
                SendAsync (home-node(s),
                        AmRetainBroker(s, Bi, released(s)[W])
            } End-transaction
        }
    }
}
```

Consolidation at SHB and Catchup Subends

As previously described, an SHB preferably maintains a consolidated stream for a given pubend p. This consolidated stream is capable of delivering a gapless subsequence of messages to any subscriber s, starting from its current seen[p] value. This will be referred to herein as "turning on" the consolidated stream for s. When a durable subscriber s reconnects with a checkpoint token CT, it is possible that CT.T[p] <seen[p]. This means that the subscriber must catchup to the consolidated stream before turning it on. This can be accomplished using, for example, a separate (unconsolidated) stream for this subscriber which is analogous to the unconsolidated subend described above in connection with FIGS. 7 and 8. This unconsolidated subend preferably uses Nack messages to retrieve old messages. When the doubt horizon of this subend catches up to the consolidated stream (i.e., the doubt horizon value exceeds the value of seen[p]), the subend is discarded and the consolidated stream is turned on for s. This methodology ensures that unconsolidated streams are only maintained for subscribers that are in the process of catching up.

Figure 15:
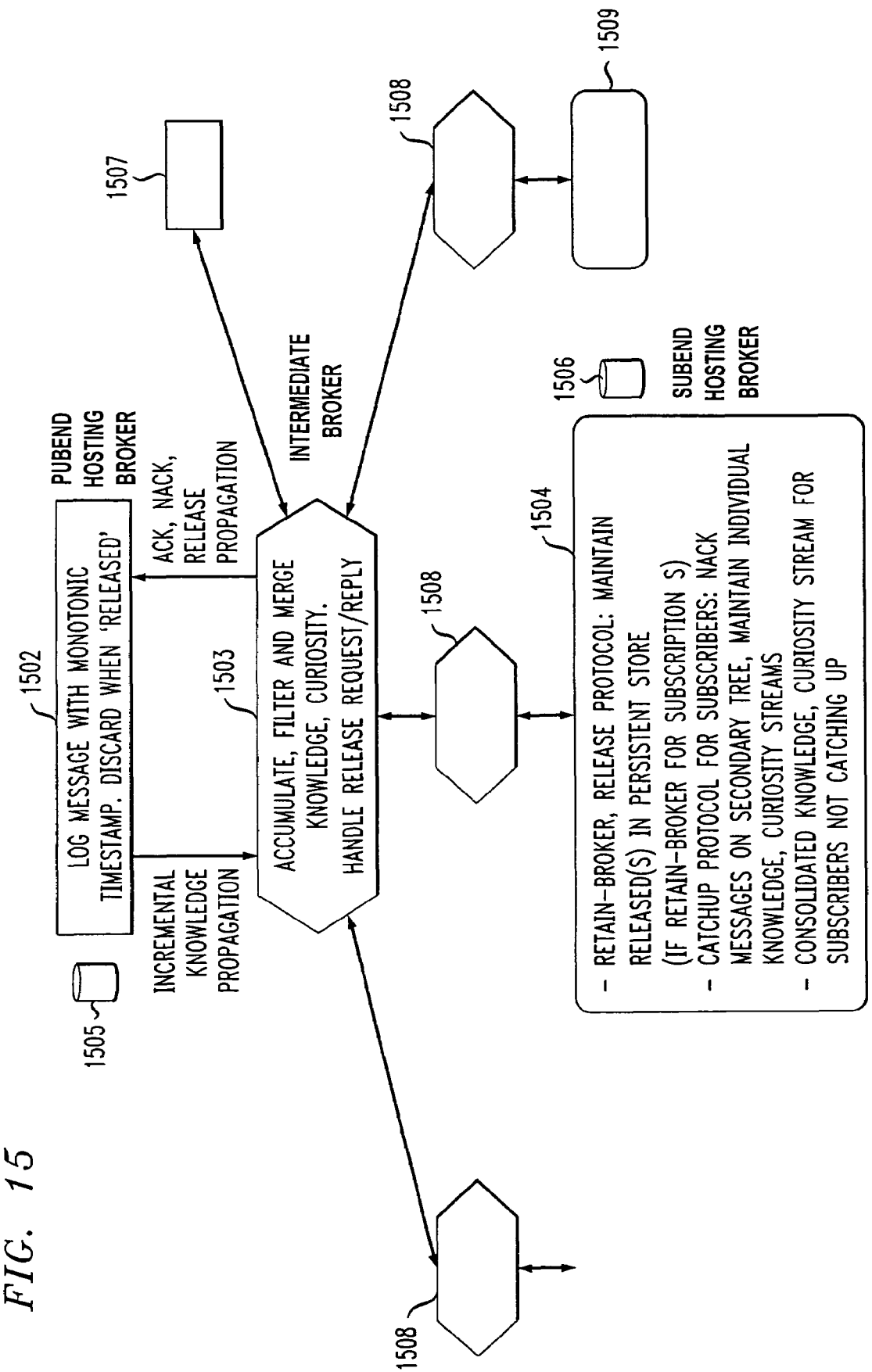
FIG. 15 is a graphical overview of the content-based publish/subscribe system of the present invention illustrating at least a portion of the methodologies performed by the individual broker entities associated with the system.

FIG. 15 is an overview of the content-based publish/subscribe system of the present invention illustrating at least a portion of the methodologies performed by the individual broker entities associated with the system. As previously stated, the system includes a plurality of brokers which may be configured as pubend hosting brokers 1502 and 1507, intermediate brokers 1503 and 1508, and subend hosting brokers 1504 and 1509. As apparent from the figure, only the pubend hosting broker 1502 requires persistent storage 1505 associated therewith in order to provide gapless delivery of messages to normal subscribers. Additionally, for durable subscribers, the subend hosting broker 1504 may require persistent storage 1506. However, as previously stated, an important advantage of the present invention is that intermediate brokers 1503, 1508 do not require persistent storage in order to guarantee gapless message delivery, even in the presence of system failures.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A content-based publish/subscribe system for providing gapless message delivery from a publishing client to a subscribing client, comprising:

a plurality of brokers operatively coupled together via a network, each of the brokers including at least one processor and memory coupled to the processor, each of the brokers being operative in at least one of a publisher-hosting broker mode, a subscriber-hosting broker mode and an intermediate broker mode, wherein:

in the publisher-hosting broker mode, the at least one processor is operative to: (i) receive a message from a publishing client coupled to the publish/subscribe system; (ii) store the received message and a stream state corresponding thereto; and (iii) transmit the message to one or more downstream brokers;

in the intermediate broker mode, the at least one processor is operative to: (i) receive a knowledge message from an upstream broker; (ii) accumulate the received knowledge message with an existing information stream; (iv) in response to a request for knowledge, transmit at least a portion of the accumulated knowledge messages satisfying at least a portion of the request for knowledge to one or more downstream brokers; and (v) transmit curiosity messages corresponding the knowledge messages that cannot be satisfied to one or more upstream brokers;

in the subscriber-hosting broker mode, the at least one processor is operative to: (i) receive a knowledge message from an upstream broker; (ii) determine an original maximum time interval in which all messages therein are known; (iii) accumulate one or more received knowledge messages in a subend knowledge stream; (iv) determine a new maximum time interval in which all messages therein are known based on the accumulated knowledge messages; and (v) when the new maximum time interval is greater than the original maximum time interval, transmit all knowledge messages between the new and original maximum time intervals to one or more subscriber clients;

whereby at least a portion of the plurality of brokers are configured so as to eliminate a need for persistent storage of messages at brokers operating in the intermediate broker mode and to substantially guarantee a gapless delivery of one or more messages transmitted by the publishing client to the subscribing client, even in the presence of a failure in the publish/subscribe system.

2. The system of claim 1, wherein in the publisher-hosting broker mode, the at least one processor, in response to a request for knowledge received from a downstream broker, is further operative to: (iv) retrieve a stream state corresponding to a time interval designated in the request for knowledge; (v) generate one or more knowledge messages corresponding to the time interval; and (vi) transmitting the one or more knowledge messages to the downstream broker from which the request for knowledge was received.

3. The system of claim 1, wherein in the publisher-hosting broker mode, the at least one processor is further operative to store a timestamp corresponding to a time at which the message is received from the publishing client.

4. The system of claim 1, wherein in the intermediate broker mode, the at least one processor is further operative to selectively filter content transmitted by the publishing client in response to criteria specified by the subscribing client.

5. The system of claim 1, wherein in the intermediate broker mode, the at least one processor is further operative to selectively merge at least two information streams and generate a single information stream corresponding thereto.

6. The system of claim 1, wherein at least one of the plurality of brokers is selectively configurable as at least one of a publisher-hosting broker, a subscriber-hosting broker, and an intermediate broker.

7. The system of claim 1, wherein at least one of the plurality of brokers is configured to selectively filter content transmitted by the publishing client in response to criteria specified by the subscribing client.

8. The system of claim 1, wherein at least one of the plurality of brokers includes persistent storage, the at least one broker, when in the subscriber-hosting broker mode, being configured so as to provide a durable message stream to at least one durable subscribing client, the at least one durable subscribing client being capable of selectively disconnecting from and reconnecting to the publish/subscribe system.

9. The system of claim 8, wherein one or more messages deliverable to the at least one durable subscribing client are persistently stored in at least one of the plurality of brokers configured in the publisher-hosting broker mode during a time interval within which the at least one durable subscribing client is disconnected from the system.

10. The system of claim 1, wherein each of the plurality of brokers is configured so as to eliminate the need for persistent storage of messages except for at least one broker which is operative in the publisher-hosting broker mode.

11. The system of claim 1, wherein gapless delivery of one or more messages comprises delivery of all subscribed messages orinating from the publishing client to the subscribing client in an order in which the messages were transmitted.

* * * * *